United States Patent
Suzuki

(10) Patent No.: US 10,015,206 B2
(45) Date of Patent: Jul. 3, 2018

(54) CLIENT DEVICE OBTAINING NETWORK CONNECTION INFORMATION FROM AN IMAGE PROCESSING APPARATUS BY CAPTURING AN IMAGE WITH A CAMERA

(71) Applicant: Ryoichi Suzuki, Kanagawa (JP)

(72) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 305 days.

(21) Appl. No.: 13/848,106

(22) Filed: Mar. 21, 2013

(65) Prior Publication Data

US 2013/0250358 A1    Sep. 26, 2013

(30) Foreign Application Priority Data

Mar. 21, 2012 (JP) .................................. 2012-064478

(51) Int. Cl.
  *G06F 3/12* (2006.01)
  *H04L 29/06* (2006.01)
  *H04L 29/08* (2006.01)

(52) U.S. Cl.
  CPC .......... *H04L 65/1069* (2013.01); *H04L 67/14* (2013.01)

(58) Field of Classification Search
  CPC ... H04L 65/1069; H04L 67/14; G06F 3/1231; G06F 3/1292; G06F 3/1236
  See application file for complete search history.

(56) References Cited

U.S. PATENT DOCUMENTS

| 7,822,411 | B2 | 10/2010 | Nakatani |
| 8,127,217 | B2* | 2/2012 | Koppich et al. ............... 715/200 |
| 8,135,684 | B2* | 3/2012 | Fedorovskaya et al. ...... 707/694 |

(Continued)

FOREIGN PATENT DOCUMENTS

| JP | 2002-175241 | 6/2002 |
| JP | 2005-190224 | 7/2005 |

(Continued)

OTHER PUBLICATIONS

Japanese Office Action dated Jan. 5, 2016.

(Continued)

*Primary Examiner* — Eric A Rust
*Assistant Examiner* — Darryl V Dottin
(74) *Attorney, Agent, or Firm* — IPUSA, PLLC

(57) ABSTRACT

A network system includes a server and an apparatus connected to the server via a network. The server includes a connection information generation part configured to generate connection information including network connection information for a portable terminal connecting to the network and apparatus connection information including the IP address of the apparatus, and a connection information transmission part configured to transmit the connection information to the apparatus. The apparatus includes an image code display part configured to display an image code into which the connection information is converted, a request reception part configured to receive a job request specifying the IP address of the apparatus and transmitted from the portable terminal having decoded the image code and connected to the network using the network connection information, and a job execution part configured to execute a job based on the job request.

19 Claims, 17 Drawing Sheets

(56) References Cited

U.S. PATENT DOCUMENTS

| | | | |
|---|---|---|---|
| 8,618,807 B2* | 12/2013 | Albarede et al. | 324/500 |
| 2006/0208088 A1 | 9/2006 | Sekiguchi | |
| 2006/0262328 A1* | 11/2006 | Nose et al. | 358/1.1 |
| 2011/0145417 A1* | 6/2011 | Tamura | 709/227 |
| 2013/0007233 A1* | 1/2013 | Lv | H04L 61/2038 |
| | | | 709/222 |
| 2013/0141747 A1* | 6/2013 | Oba | G06F 3/1292 |
| | | | 358/1.14 |
| 2014/0010225 A1* | 1/2014 | Puregger | H04W 12/06 |
| | | | 370/338 |

FOREIGN PATENT DOCUMENTS

| | | |
|---|---|---|
| JP | 2006-261938 | 9/2006 |
| JP | 2007-026108 | 2/2007 |
| JP | 2007-164448 | 6/2007 |
| JP | 2008-040914 | 2/2008 |
| JP | 2009-163632 | 7/2009 |
| JP | 2011-150647 | 8/2011 |

OTHER PUBLICATIONS

Japanese Office Action dated May 17, 2016.
Chiaki Satoh, "How to utilize a multifunction printer," Nikkei PC Beginners, Japan, Nikkei Business Publications, Inc., Sep. 13, 2011, vol. 2, No. 10, pp. 18-19.
Japanese Office Action for 2012-064478 dated Jan. 17, 2017.

* cited by examiner

FIG.8

| GROUP AFFILIATION | USER ID | DOCUMENT NAME | URI | SHARABILITY |
|---|---|---|---|---|
| 001 | aaa | A.doc | ¥001/aaa/ | NO SHARING |
| 001 | bbb | B1.doc | ¥001/bbb/ | SHARABLE WITHIN GROUP |
| 001 | bbb | B2.doc | ¥001/bbb/ | UNLIMITED SHARING |

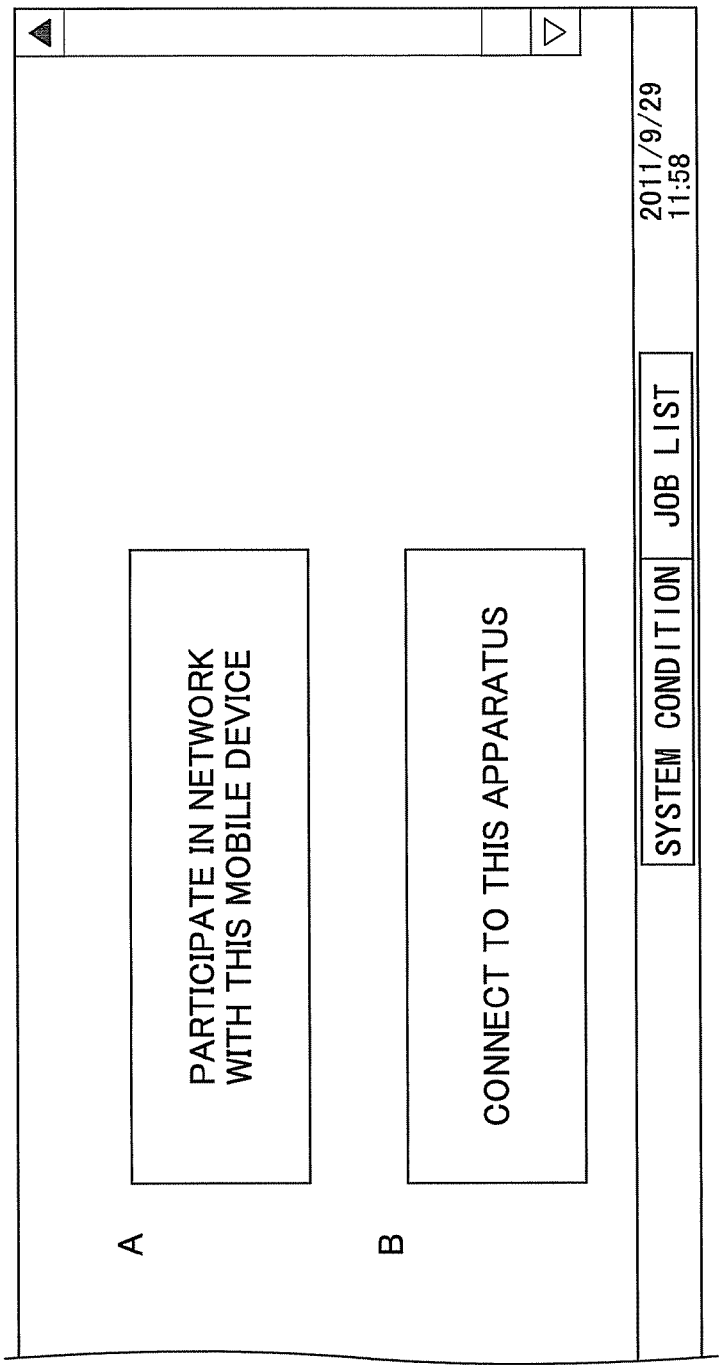

CLIENT DEVICE OBTAINING NETWORK CONNECTION INFORMATION FROM AN IMAGE PROCESSING APPARATUS BY CAPTURING AN IMAGE WITH A CAMERA

CROSS-REFERENCE TO RELATED APPLICATION

The present application is based upon and claims the benefit of priority of Japanese Patent Application No. 2012-064478, filed on Mar. 21, 2012, the entire contents of which are incorporated herein by reference.

BACKGROUND OF THE INVENTION

1. Field of the Invention

The present invention relates to a network system in which an apparatus and a server are connected via a network.

2. Description of the Related Art

It is often the case that a user who is out of office on a business trip or the like wishes to connect a terminal that the user carries to a network. Once the connection to the network is established, it is possible to use a cloud service or to access an office server and use a stored document by connecting to, for example, the Internet.

However, in order to establish a connection to a network, it is necessary to do some setup in the portable terminal except in the case of a special network that is open to an unspecified number of users. For example, a service set identifier (SSID) and an encryption key are necessary to connect to an access point of a wireless local area network (LAN). The IP address of the portable terminal is further required to connect to the Internet. Further, in order to access an apparatus such as a printer, the IP address of the apparatus is required.

For example, if the apparatus has a display part formed from, for example, a liquid crystal, the connection information of an access point near the apparatus may be displayed on the display part. A user may access a network via the access point by setting the connection information in the portable terminal.

Further, the IP address of the portable terminal is dynamically provided by, for example, a dynamic host configuration protocol (DHCP) server. The IP address of the apparatus as well is dynamically assigned by, for example, the DHCP server. When the user accesses the apparatus using the portable terminal, the apparatus displays the IP address of the apparatus. The user sets the IP address of the apparatus in the portable terminal, so that the portable terminal and the apparatus may communicate with each other. Even if the IP address of the apparatus delivered by the DHCP server is different at every delivery, it is possible for the user to set the IP address of the apparatus in the portable terminal.

However, it is considered undesirable for security reasons to display connection information in a human readable manner. Therefore, one idea is to cause the apparatus, for example, a multifunction peripheral (MFP), to convert connection information into a barcode. (See, for example, Japanese Laid-Open Patent Application No. 2007-164448.) Japanese Laid-Open Patent Application No. 2007-164448 discloses an operation system where an operation apparatus reads a QR code (a registered trademark) (hereinafter, this notation is omitted) displayed by an electronic apparatus and transmits an identification code included in the QR code to the electronic apparatus via a cellular phone base station, and the electronic apparatus performs an operation received from the operation apparatus when the received identification code matches the identification code included in the displayed QR code.

SUMMARY OF THE INVENTION

According to an aspect of the present invention, a network system includes a server; and an apparatus connected to the server via a network, wherein the server includes a connection information generation part configured to generate connection information including network connection information for a portable terminal connecting to the network and apparatus connection information including an IP address of the apparatus; and a connection information transmission part configured to transmit the connection information to the apparatus, and wherein the apparatus includes an image code display part configured to display an image code into which the connection information is converted; a request reception part configured to receive a job request specifying the IP address of the apparatus and transmitted from the portable terminal having decoded the image code and connected to the network using the network connection information; and a job execution part configured to execute a job based on the job request.

According to an aspect of the present invention, an apparatus connected to a server via a network includes an image code display part configured to display an image code into which connection information is converted, wherein the connection information is generated in and transmitted from the server and includes network connection information for a portable terminal connecting to the network and apparatus connection information including an IP address of the apparatus; a request reception part configured to receive a job request specifying the IP address of the apparatus and transmitted from the portable terminal having decoded the image code and connected to the network using the network connection information; and a job execution part configured to execute a job based on the job request.

According to an aspect of the present invention, a server connected to an apparatus via a network includes a connection information generation part configured to generate connection information including network connection information for a portable terminal connecting to the network and apparatus connection information including an IP address of the apparatus; and a connection information transmission part configured to transmit the connection information to the apparatus.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 8 illustrates a management table retained by a document data management part;

FIGS. 9A, 9B, and 9C are diagrams illustrating screens displayed on a display part of the MFP;

DETAILED DESCRIPTION OF THE PREFERRED EMBODIMENTS

As described above, Japanese Laid-Open Patent Application No. 2007-164448 discloses an operation system where an electronic apparatus displays a QR code including an identification code and an operation apparatus reads the identification code included in the displayed QR code.

According to this operation system, however, the locally installed electronic apparatus creates the identification code. Therefore, there is no guarantee that the identification code generated by the electronic apparatus is not a duplicate of the identification code of another electronic apparatus. If the identification code generated by the electronic apparatus is a duplicate of the identification code of another electronic apparatus, the operation apparatus communicates with the other (improper) electronic apparatus, and is prevented from operating the nearest electronic apparatus.

Further, in the case of considering the information generated by the electronic apparatus as not an identification code but an IP address, a unique IP address is not necessarily given to the operation apparatus although the electronic apparatus is given a unique IP address. Therefore, there may be a duplicate IP address in the network. That is, even when the electronic apparatus simply codes an IP address and the operation apparatus sets the coded IP address in the operation apparatus, there is no guarantee that the operation apparatus and the electronic apparatus can communicate with each other without problems.

Providing the electronic apparatus with the function of the above-described DHCP server guarantees the uniqueness of the IP address and makes it possible to perform name resolution based on the IP address. However, it is not practical to provide a single electronic apparatus with the function of the DHCP server.

It is possible to connect the DHCP server to the network. However, as described above, it is necessary to connect to an access point of a wireless LAN to obtain an IP address, and connecting the DHCP server to the network alone is not sufficient.

According to an aspect of the present invention, a network system is provided where a portable terminal that participates in a network smoothly obtains connection information for connecting to the network.

A description is given below, with reference to the accompanying drawings, of one or more embodiments of the present invention.

Figure 1:
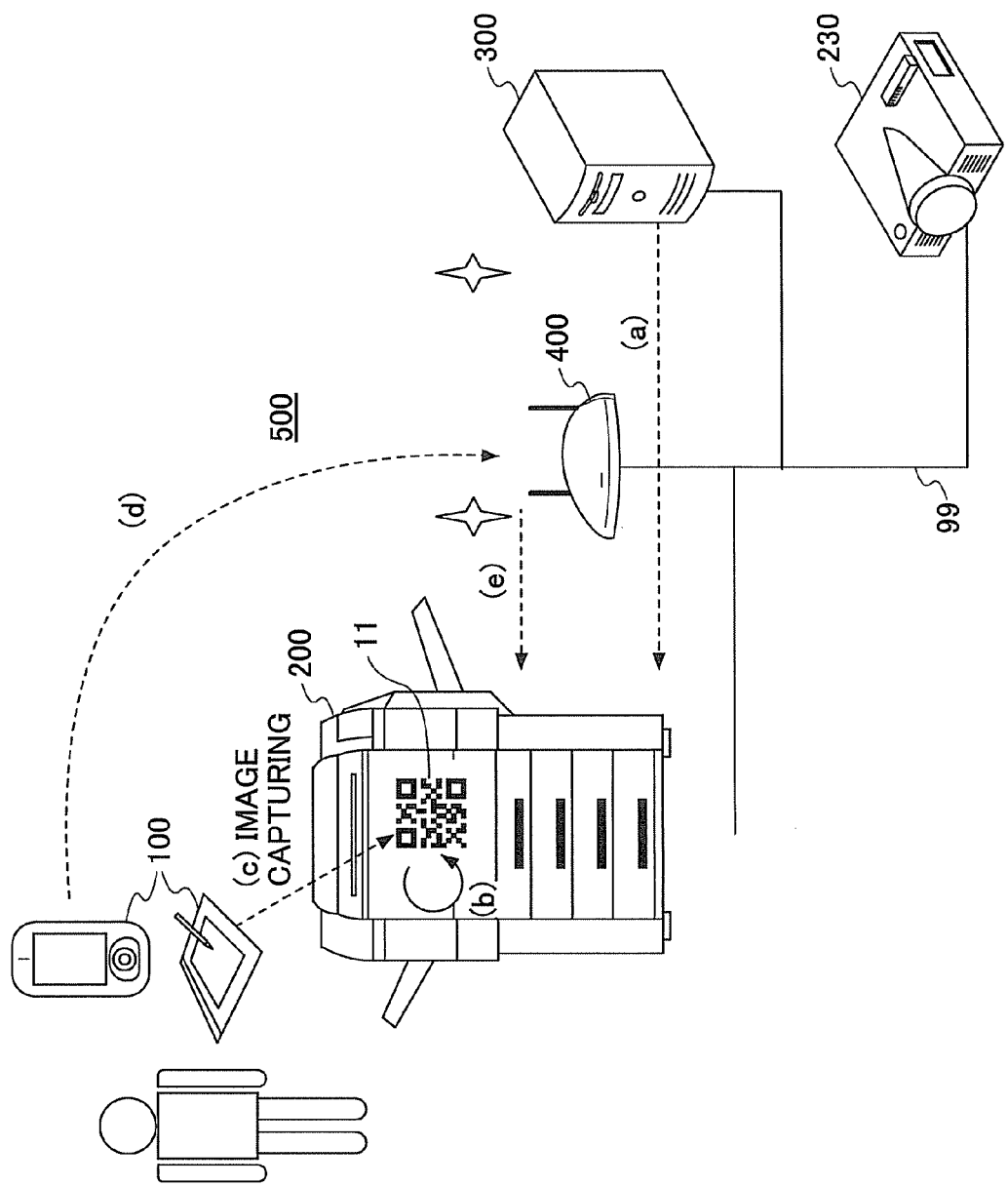
FIG. 1 is a diagram illustrating an outline of a network system according to an embodiment.

FIG. 1 is a diagram illustrating an outline of a network system 500 according to an embodiment. A user goes out carrying a portable terminal 100 such as a smartphone or a tablet terminal, and wishes to connect to a network 99 of a location (for example, a floor, building, or office different from a floor, building, or office where the user works) that the user visits (a visited location).

If there is a hub or a layer 2 (L2) switch, it is possible to establish a wired connection to the network 99. In this case, however, the portable terminal 100 needs an interface and a cable. Therefore, according to this embodiment, the portable terminal 100 establishes a wireless (radio) connection to the network 99. A wireless LAN access point (hereinafter simply referred to as "access point") 400 is known as a structure for the portable terminal 100 establishing a wireless connection to a LAN. A service set identifier (SSID) and an encryption key are necessary to connect to the access point (AP) 400. Of these, the SSID is distributed around from a common access point (not in a stealth mode) by an electric beacon. However, it is not possible to connect to the access point 400 unless the encryption key is known. Further, it is necessary for the portable terminal 100 to be given an IP address in order to connect to the Internet.

Further, it is necessary for the portable terminal 100 to be informed of the IP address of an MFP 200 in order to communicate with the MFP 200.

Therefore, a server 300, the MFP 200, and the portable terminal 100 operate as follows.

(a) The server 300 transmits an IP address to be provided to the portable terminal 100 to the MFP 200. The server 300 has the function of a DHCP server and the function of a dynamic domain name system (DNS) server (hereinafter simply referred to as the "DNS server"), and generates a unique IP address for the portable terminal 100. Further, at this point, the server 300 transmits the SSID and the encryption key of the access point 400 to the MFP 200.

(b) The MFP 200 displays a QR code or a barcode (hereinafter simply referred to an "image code 11") that includes the SSID and the encryption key of the access point 400 and the IP address of the portable terminal 100 on a display part. The image code 11 may be generated either by the server 300 or the MFP 200. When a user uses a projector 230, the projector 230 projects the image code 11.

(c) The user operates the portable terminal 100 to capture an image of the image code 11 and decode the SSID and the encryption key of the access point 400 and the IP address of the portable terminal 100. The use sets the SSID and the encryption key of the access point 400 and the IP address in the portable terminal 100.

(d) As a result of the SSID and the encryption key of the access point 400 being set in the portable terminal 100, the portable terminal 100 is allowed to access the access point 400. Further, because the IP address is set, the portable terminal 100 is allowed to communicate with other apparatuses if the IP addresses (or host names) of the other apparatuses are known. For example, the IP address of the MFP 200 may be obtained through the image code 11 or the server 300 may be queried about the IP address of the MFP 200.

In the following description, the SSID and the encryption key of the access point 400, the IP address of the portable terminal 100, and the IP address of the MFP 200 may be referred to as "connection information" without distinguishing them. Further, depending on a network environment, the connection information may include information other than those information items described above.

(e) The portable terminal 100, which has obtained the IP address of the MFP 200, is allowed to transmit document data to the MFP 200 and have the document data printed out.

Thus, according to the network system 500 of this embodiment, the connection information for connecting to the network 99 (the access point 400) and the IP address of the MFP 200 are provided as the image code 11. Therefore, it is possible to prevent the degradation of security.

The IP address of the portable terminal 100 is created by the server 300. Therefore, it is possible to guarantee the uniqueness of the IP address in the network 99. Accordingly, it is possible for a user to use the MFP 200 with a simple operation of capturing the image of the image code 11 using the portable terminal 100 when the user is out. That is, it is possible to use the MFP 200 from anywhere with a simple operation when there is an environment where it is possible to connect to the network 99.

[Example Configuration]

Figure 2:
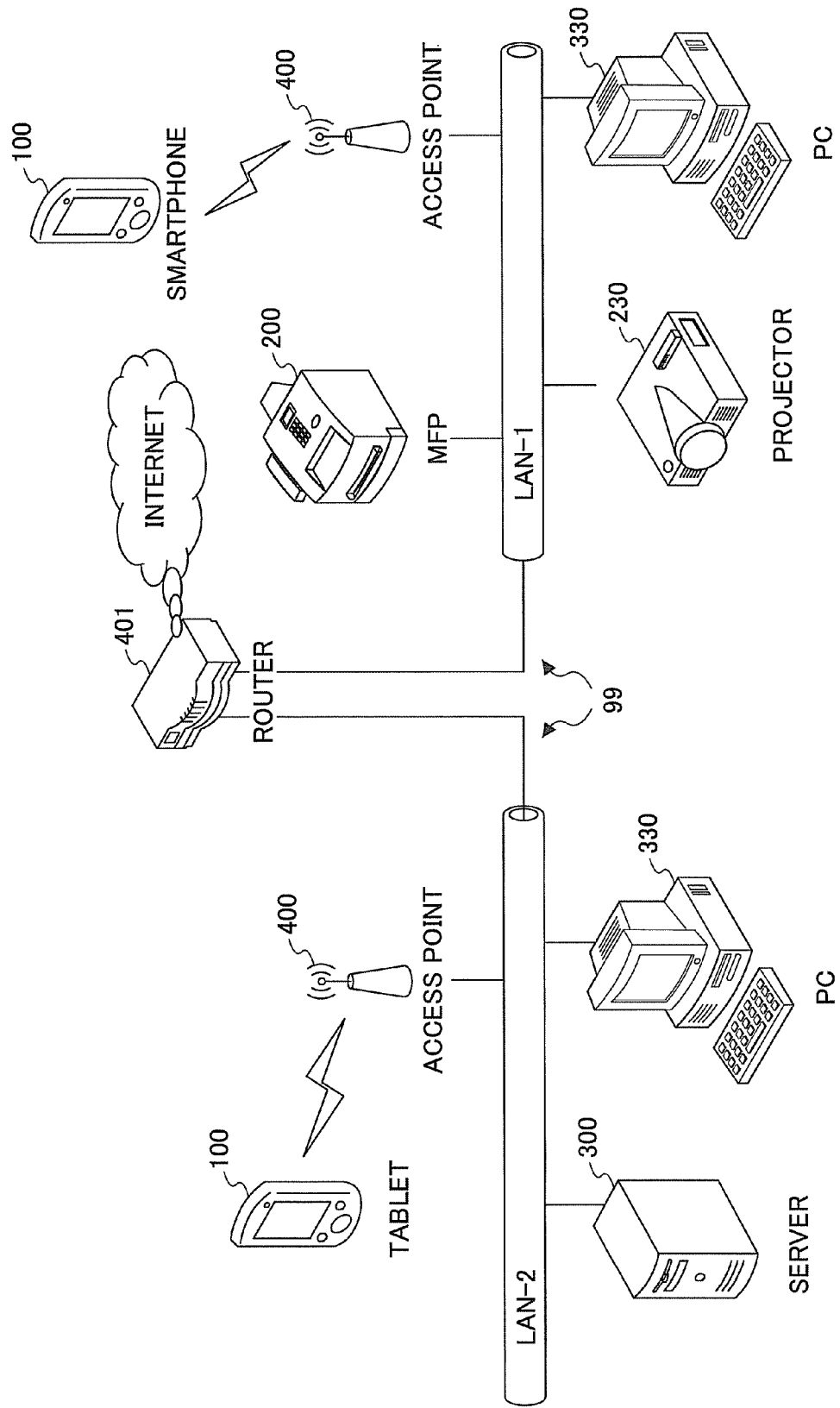
FIG. 2 is a schematic diagram illustrating a configuration of the network system according to the embodiment.

FIG. 2 is a schematic diagram illustrating a configuration of the network system 500 of this embodiment. The server 300, personal computer (PC)s 330 (hereinafter also collectively referred to as the "PC 330"), the MFP 200, and the projector 230 are stationary apparatuses connected in advance to a LAN-1 or LAN-2 (and are hereinafter referred to as "apparatuses" when they are not distinguished). Each of the apparatuses is connected to the LAN-1 or LAN-2 by wire, but may be connected wirelessly to the LAN-1 or LAN-2 via the access point 400.

The network system 500 includes two LANs, that is, the LAN-1 and the LAN-2, and the LAN-1 and the LAN-2 are connected to each other via a router 401. The access point 400 is provided in each of the LAN-1 and the LAN-2, and the portable terminal 100 connects to the LAN-1 or the LAN-2 via the access point 400. The access point 400 may be provided in either the LAN-1 or the LAN-2. Multiple access points 400 may be provided in a single LAN.

According to this embodiment, a "network" may include the LAN-1 or the LAN-2, or at least one of the LAN-1 and the LAN-2 and the Internet.

The LAN-1 and the LAN-2 are provided with respective network addresses. The apparatuses connected to the LAN-1 have a common network address, and the apparatuses connected to the LAN-2 have a common network address.

The router 401 separates the LAN-1 and the LAN-2, and controls communications between the LAN-1 and the LAN-2. That is, an Ethernet (registered trademark) frame or a MAC frame (hereinafter simply referred to as "frame") transmitted by an apparatus connected to the LAN-1 may be received by all apparatuses of the LAN-1 including the router 401. Each apparatus selectively receives a frame whose destination MAC address is the address of the apparatus. When the destination MAC address of a frame is the address of the router 401, the router 401 specifies a network address referring to the IP address of a destination, and for example, relays the frame to the LAN-2. Further, the Internet is connected to the router 401, and the router 401 performs path control such as transmission of an IP-layer packet to the Internet side depending on the IP address of a destination.

Further, the router 401 may have virtual LAN (VLAN) functions such as treating the LAN-1 and the LAN-2 as a single LAN and treating some apparatuses of the LAN-1 and some apparatuses of the LAN-2 as connected to the same LAN.

Referring to FIG. 2, a tablet and a smartphone are illustrated as examples of the portable terminal 100. The portable terminal 100 may be an information processor including a camera and a wireless LAN communications function. Other examples of the portable terminal 100 include a notebook PC, a personal digital assistant (PDA), a netbook, and a cellular phone. Either the portable terminal 100 includes a communications device for connecting to a LAN, or an adapter for connecting to a LAN is attachable to the portable terminal 100 and the portable terminal 100 has a MAC address.

The server 300 has the function of a DHCP server and the function of a DNS server. These functions may be provided in separate information processors. As a DHCP server, the server 300 provides apparatuses connected to the LAN-1 or the LAN-2 with respective unique IP addresses. When there is only one DHCP server for two LANs as illustrated in FIG. 2, the router 401 is preset to relay a broadcast request from a DHCP client (for example, the MFP 200 as the portable terminal 100 does not directly become a DHCP client in this embodiment) (a relay agent function). The DHCP server delivers an IP address in response to a request from the DHCP client. It is assumed that other apparatuses are provided in advance with respective IP addresses.

The server 300 as a DNS server correlates the host names of apparatuses connected to the LAN-1 or the LAN-2 with their corresponding IP addresses. As a DNS server, the server 300, in response to receiving an IP address from an apparatus, returns the host name correlated with the IP address, and in response to receiving a host name from an apparatus, returns the IP address correlated with the host name.

Preferably, the server 300 is integrated with a document management server or authorized to access a document management server. The document management server is a server in which the documents of users are stored. It is possible for a user to make such usage as accessing the document management server via the LAN-1 or the LAN-2 and printing a document with the MFP 200.

The MFP 200 has the functions of a printer, a scanner, a facsimile (FAX) machine, a copier, etc., and is often referred to as a multifunction machine. The MFP 200 does not have to have all of these functions, and may have only one of them, such as the function of a printer or a facsimile machine. According to this embodiment, it is assumed that a document is printed or facsimile transmission is performed as a result of the portable terminal 100 being enabled to communicate with the MFP 200.

The projector 230 is an apparatus that directly projects a screen of an apparatus connected by an image transmission cable such as a D-sub connector cable or the like. According to this embodiment, the projector 230 may convert a document file into an image and project the image. That is, when the portable terminal 100 transmits a document file of, for example, a JPEG or PDF format to the projector 230, the projector 230 may projects the image of the document of the received file.

The PC 330 is an example of an apparatus according to this embodiment, and may provide services such as optical character reading of a document and compression of a document in response to a request from the portable terminal, for example.

[Hardware Configuration]

Figure 3:
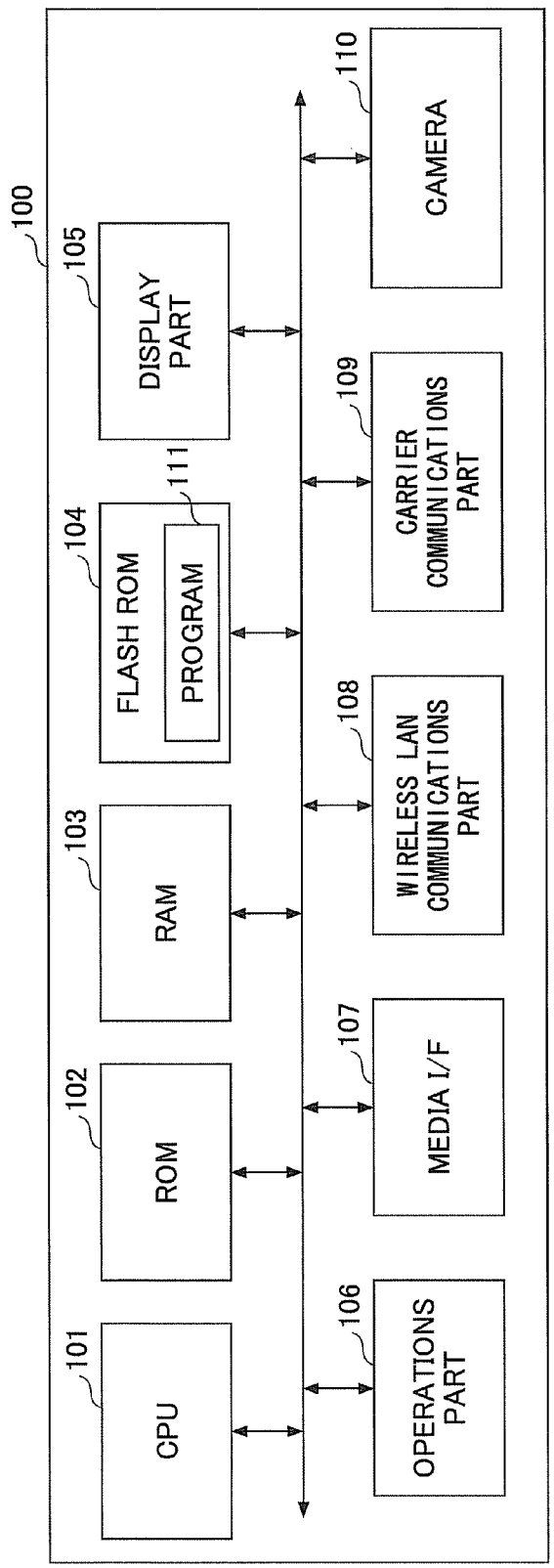
FIG. 3 is a diagram illustrating a hardware configuration of a portable terminal.

FIG. 3 is a block diagram illustrating a hardware configuration of the portable terminal 100. As described above, the portable terminal 100 is a portable information processor. The portable terminal 100 includes a wireless LAN communications part 108 that connects to a wireless LAN and a carrier communications part 109. The carrier communications part 109 may not be used in particular in this embodiment.

The wireless LAN communications part 108 controls a modulation system, a transmission rate, a frequency, etc., based on IEEE 802.11b, 11a, 11g, and 11n, and converts a received radio wave into a digital signal. Further, the wireless LAN communications part 108 performs modulation on data requested to transmit by a central processing unit (CPU) 101 in accordance with a standard, and transmits the data as a radio wave.

The carrier communications part 109 performs communications depending on the telecommunications carrier with which the user of the portable terminal 100 has signed up. Examples of telecommunications carriers include cellular phone operators that provide communications services according to communications standards such as CDMA and LTE, and WiMAX operators. A subscriber identity module (SIM) card is attached to the carrier communications part 109. The SIM card is an IC card in which the subscriber information that a telecommunications carrier issues to a subscriber is stored. Information such as a unique number called international mobile subscriber identity (IMSI) and a cellular phone number is stored in the SIM card.

The carrier communications part 109 performs modulation according to the communications system determined by a telecommunications carrier, and communicates with a base station (not graphically illustrated) connected to the Internet. The base station is connected to the carrier server of the telecommunications carrier, and the carrier server provides the portable terminal 100 with a temporary IP address (which is not used in this embodiment). The portable terminal 100 may communicate with the server 100 via the Internet.

The portable terminal 100 further includes the CPU 101, a read-only memory (ROM), a random access memory (RAM) 103, a flash ROM 104, a display part 105, an operations part 106, a media interface (I/F) part 107, and a camera 110. The CPU 101 controls the overall operation of the portable terminal 100 by executing a program 111 stored in the flash ROM 104. The ROM 102 stores an initial program loader (IPL) and static data. The RAM 103 is used as a work area when the CPU 101 executes the program 111.

The flash ROM 104 contains the program 111 executed by the CPU 101. The program 111 includes an operating system (OS) (such as Android (registered trademark), iOS (registered trademark), and Windows (registered trademark)), middleware, and a program that provides the following functions of the portable terminal 100.

The display part 105 displays a user interface (UI) screen of a liquid crystal or organic EL. A graphic control part (not graphically illustrated) interprets a rendering command that the CPU 101 writes to a video RAM, and displays various kinds of information such as a window, a menu, a cursor, characters, and images on the display part 105. The display part 105 integrates a touchscreen panel.

The operations part 106 includes hard keys, buttons, and a touchscreen panel that receive a user's operation. The contents of the operation are communicated to the CPU 101.

The media I/F 107 controls writing data to (storing data in) and reading data from recording media such as a flash memory.

The program 111 is distributed by way of being recorded in a computer-readable recording medium in a file of an installable or executable format. Further, the program 111 may be distributed from a server (not graphically illustrated) to the portable terminal 100 in a file of an installable or executable format.

Figure 4:
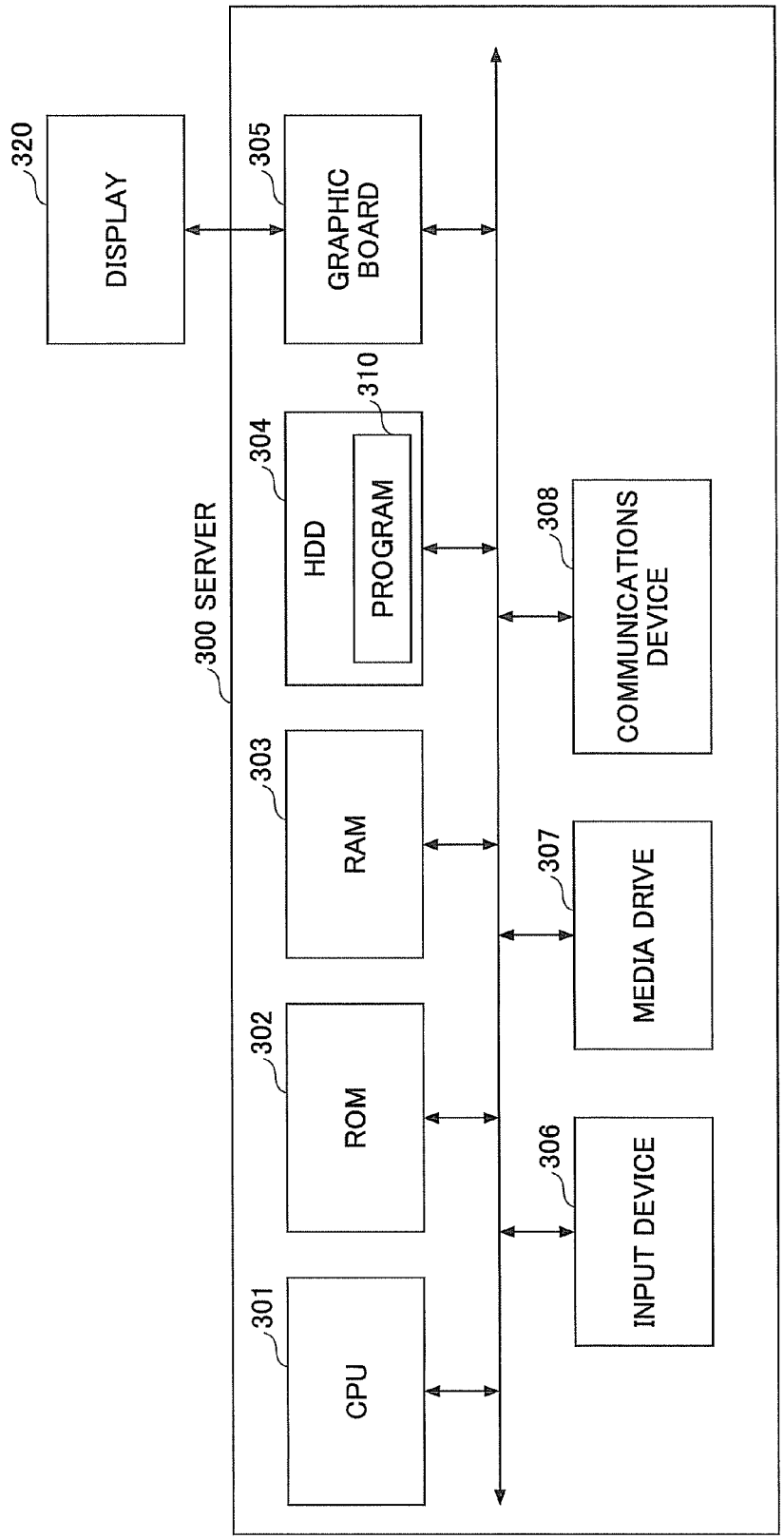
FIG. 4 is a block diagram illustrating a hardware configuration of a server.

FIG. 4 is a block diagram illustrating a hardware configuration of the server 300. The server 300 may have a configuration of a common information processor.

The server 300 includes a CPU 301, a ROM 302, a RAM 303, a hard disk drive (HDD) 304, a graphic board 305, an input device 306, a media drive 307, and a communications device 308. The CPU 301 controls the overall operation of the server 300 by executing a program 310 stored in the HDD 304 using the RAM 303 as a work memory. The input device 306, which includes a keyboard and a mouse, receives a user's operation. The media drive 307 writes data to and reads data from optical media such CDs, DVDs, and Blu-ray (trademark) disks. The communications device 308 is, for example, an Ethernet (registered trademark) card for connecting to the LAN-1 or the LAN-2. The graphic board 305 may be connected to an external display 320.

The program 310 includes an OS (such as Windows or Linux (registered trademark)), middleware, and a program that provides the following functions. The program 310 is distributed by way of being recorded in a computer-readable recording medium in a file of an installable or executable format. Further, the program 310 may be distributed from a server (not graphically illustrated) in a file of an installable or executable format.

Figure 5:
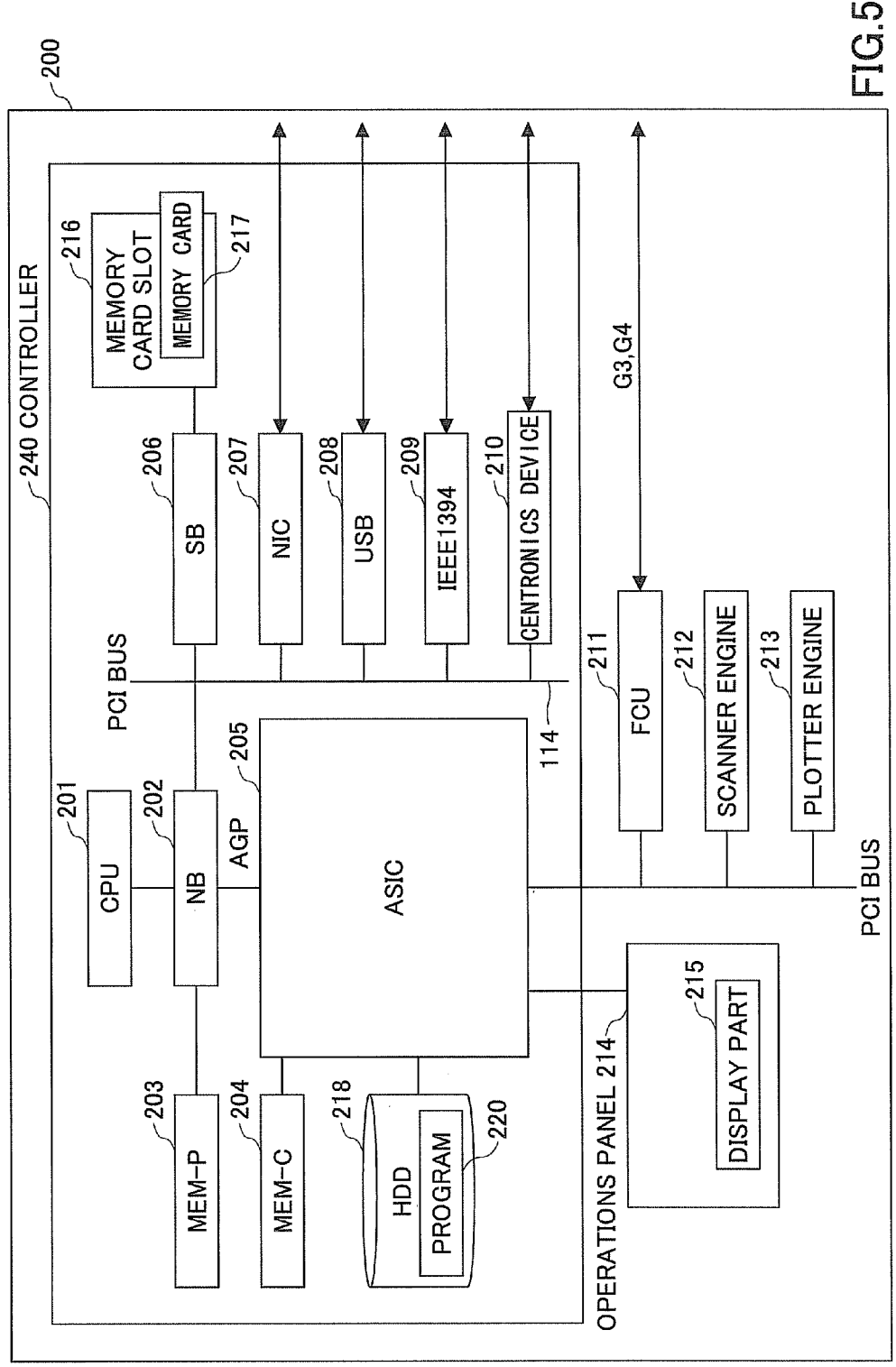
FIG. 5 is a block diagram illustrating a hardware configuration of an MFP.

FIG. 5 is a block diagram illustrating a hardware configuration of the MFP 200. The MFP 200 includes a controller 240, an operations panel 214, a facsimile control unit (FCU) 211, a scanner engine 212, and a plotter engine 213.

The controller 240 includes a CPU 201, an application specific integrated circuit (ASIC) 205, a Northbridge (NB) 202, a Southbridge (SB) 206, a system memory (MEM-P) 203, a local memory (MEM-C) 204, an HDD 218, a memory card slot 216, a network interface controller (NIC) 207, a universal serial bus (USB) device 208, an IEEE 1394 device 209, and a Centronics device 210.

The CPU 201 is an IC for executing various information processes, and executes programs that provide applications and services in parallel on a process basis based on an OS such as UNIX (registered trademark) or Linux. The ASIC 205 is an IC for image processing. The NB 202 is a bridge for connecting the CPU 201 and the ASIC 205. The SB 206 is a bridge for connecting the NB 202 and peripheral devices. The ASIC 205 and the NB 202 are connected via an accelerated graphics port (AGP).

The MEM-P 203 is a memory connected to the NB 202. The MEM-C 204 is a memory connected to the ASIC 205. The HDD 220 is a storage connected to the ASIC 205, and is used to store image data, document data, programs, font data, form data, etc.

The memory card slot 216 is connected to the SB 206, and is used to receive (by insertion) a memory card 217. The memory card 217 is, for example, a flash memory such as a USB memory, and is used to distribute a program 220.

The NIC 207 is a controller for performing data communications using MAC addresses or the like via a network. The USB device 208 is a device for providing a serial port based on the USB standard. The IEEE 1394 device 209 is a device for providing a serial port based on the IEEE 1394 standard. The Centronics device 210 is a device for providing a parallel part based on the Centronics specifications. The NIC 207, the USB device 208, the IEEE 1394 device 209, and the Centronics device 210 are connected to the NB 202 and the SB 206 via a peripheral component interconnect (PCI) bus.

The program 220 includes an OS, middleware, and a program that provides the following functions. The program 220 is distributed by way of being recorded in a computer-readable recording medium in a file of an installable or executable format. Further, the program 220 may be distributed from a server (not graphically illustrated) in a file of an installable or executable format.

The operations panel 214 is a hardware item (an operations part) for a user to make an input to the MFP 200, and includes a display part 215 that is a hardware item for the MFP 200 to provide a user with visible information. The operations panel 214 is connected to the ASIC 205. The FCU 211, the scanner engine 212, and the plotter engine 213 are connected to the ASIC 205 via a PCI bus.

The scanner engine 212 optically scans an original material placed on a contact glass and performs image processing by performing analog-to-digital (A/D) conversion on the reflected light, thereby generating digital data (hereinafter referred to "image data") of a predetermined resolution.

The plotter engine 213 includes, for example, tandem photosensitive drums. The plotter engine 213 modulates laser beams based on the image data or the PDL data received from the PC 330, and scans the photosensitive drums with the laser beams, thereby forming latent images. Then, the plotter engine 213 transfers the image of each page developed by causing toner to adhere to the latent images onto a recording medium such as paper with heat and pressure. The plotter engine 213 is not limited to this electrophotographic plotter, and may be an inkjet plotter engine that forms an image by ejecting liquid droplets.

The FCU 211 connects to a network via the NIC 207 and transmits and receives image data in accordance with, for example, a communications procedure corresponding to the T.37 or T.38 standard, or connects to a public communications network and transmits and receives image data in accordance with, for example, a communications procedure corresponding to the G3 or G4 standard. Further, even in the case of receiving image data when the MFP 200 is turned off, the FCU 211 may activate the plotter engine 213 and print the image data on a recording medium.

[Communications Protocols]

Figure 6:
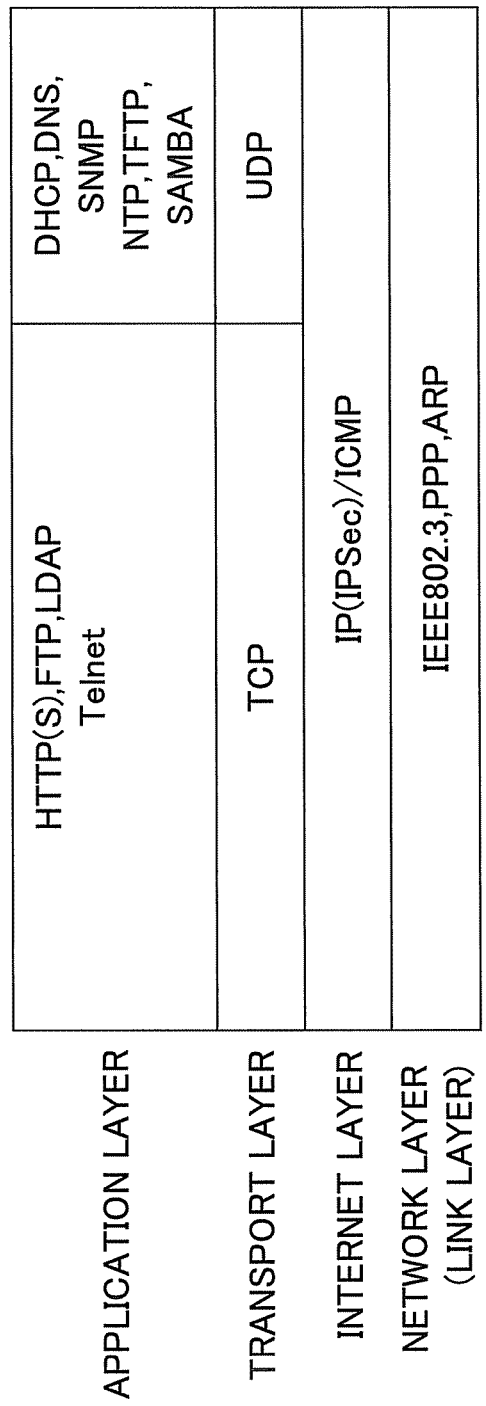
FIG. 6 is a diagram illustrating protocols used in a common IP network.

FIG. 6 is a diagram illustrating protocols used in a common IP network. According to the Open Systems Interconnection (OSI) model, communications are managed by a hierarchical structure of the Physical layer (Layer 1), the Data Link layer (Layer 2), the Network layer (Layer 3), the Transport layer (Layer 4), the Session layer (Layer 5), the Presentation layer (Layer 6), and the Application layer (Layer 7). A layer encapsulates the data of the layer above it. Therefore, each layer may execute the same process irrespective of the layer above it. In the case of performing communications using TCP (UDP)/IP, the OSI model is often used by way of being simplified into four layers.

As illustrated in FIG. 6, the four layers are the Network layer, the Internet layer, the Transport layer, and the Application layer. FIG. 6 illustrates typical protocols of each of the layers. IEEE 802.3 (Ethernet (registered trademark)), the Point-to-Point Protocol (PPP), the Address Resolution Protocol (ARP), etc., are known as protocols of the Network layer. The Internet Protocol (IP), the Security Architecture for Internet Protocol (IPsec), the Internet Control Message Protocol (ICPM), etc., are known as protocols of the Internet layer. The Transmission Control Protocol (TCP), the User Datagram Protocol (UDP), etc., are known as protocols of the Transport layer. The Hypertext Transfer Protocol (HTTP), the HTTP over Secure Socket Layer (HTTPS), the File Transfer Protocol (FTP), the Lightweight Directory Access Protocol (LDAP), the Telecommunication Network (Telnet), DHCP, DNS, the Simple Network Management Protocol (SNMP), the Network Time Protocol (NTP), the Trivial File Transfer Protocol (TFTP), SAMBA, etc., are known as protocols of the Application layer. Here, DNS is used to mean a domain name server and the DNS protocol.

The Network layer constructs a physical communications layer with other apparatuses. The Network layer amplifies voltage and shapes a signal waveform, and mediates communications. Further, data of the Network layer are frames, and addresses that identify apparatuses in the frames are MAC addresses.

IP, which is a protocol of the Internet layer, causes a packet to reach a communication counterpart based on the IP address of the communication counterpart. ICMP is a protocol that is supplementary to IP. ICMP supports commands such as an echo request that specifies an IP address and requests a response from a communication counterpart and an echo reply that is a response to the echo request.

When it is necessary to establish a session or connection in the Transport layer, TCP is used. TCP decomposes data to be communicated into packets and reconstructs the data. TCP establishes a session with a communication counterpart and controls a communications procedure. Further, TCP identifies an upper-layer application by a port number, and bridges the Internet layer and the Application layer. In communications that do not require establishment of a session or connection, UDP is used.

The Application layer performs communications in accordance with protocols such as HTTP. Preferable protocols are determined for each of TCP and UDP. Protocols of the Application layer above the TCP layer require establishment of a session such as control of order of communications (HTTP(S), FTP, LDAP, and Telnet). Protocols of the Application layer above the UDP layer do not require a session or connection (DHCP, DNS, SNMP, NTP, and TFTP).

The services of the Application layer are provided by the server 300. (The client side also implements the protocols of the Application layer by using the functions of the server 300.) According to the network system 500 of this embodiment, the server 300 provides functions equivalent to DHCP and DNS. For example, in DNS, a name resolution function is well known that obtains an IP address from a host name using an nslookup command. Further, in DHCP, a DHCP client broadcasts a DHCPDISCOVER message to the server 300, and the server 300 delivers an IP address in response to the message. At this point, the DHCP client is often informed of a subnet mask and a default gateway as well.

[Functions of Network System]

Figure 7:
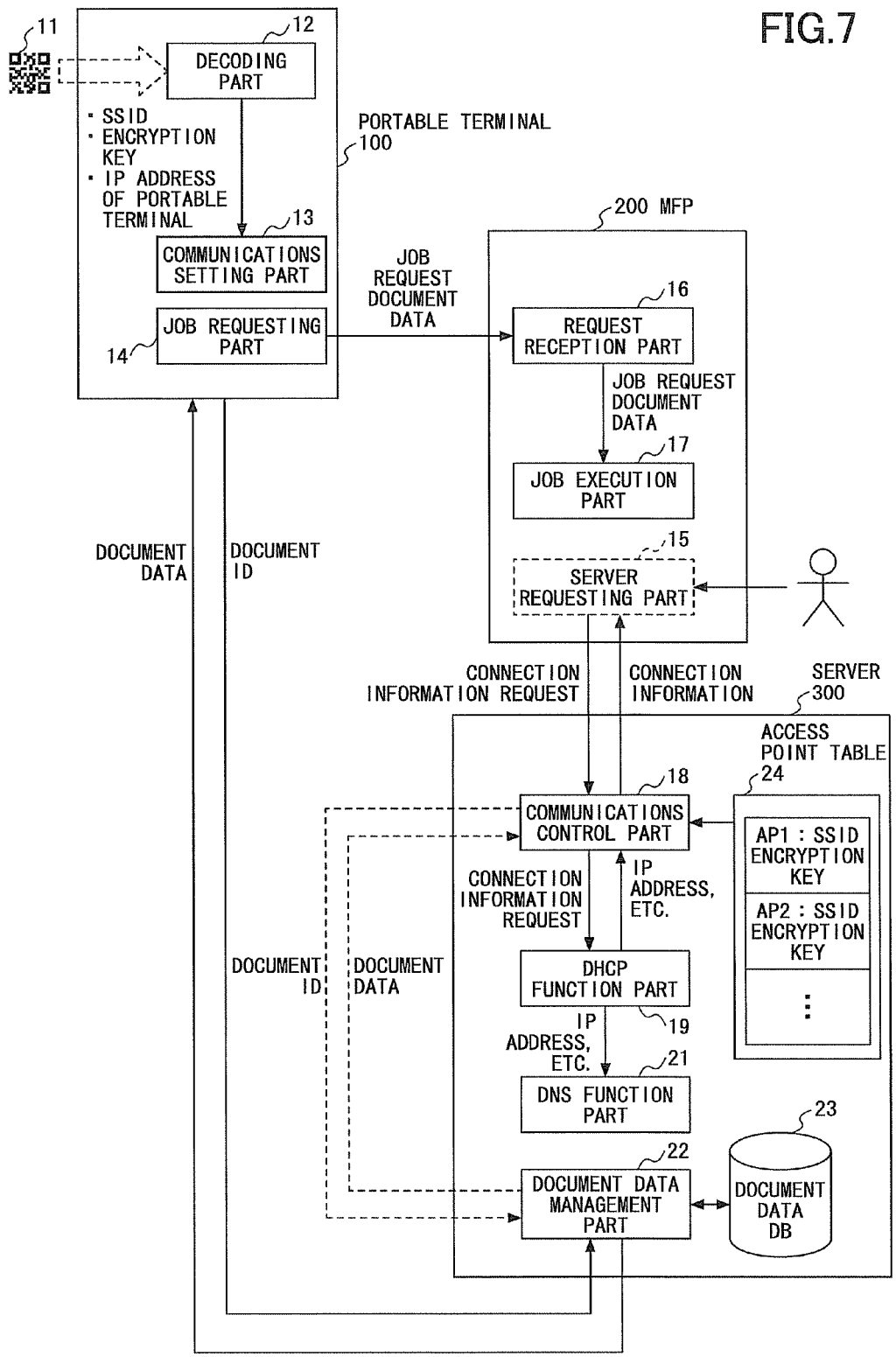
FIG. 7 is a functional block diagram illustrating the network system.

FIG. 7 is a functional block diagram illustrating the network system 500. The CPU 101 of the portable terminal 100, the CPU 201 of the MFP 200, and the CPU 301 of the server 300 execute respective programs and cooperate with hardware items, thereby implementing the functions of the network system 500.

[Portable Terminal]

The portable terminal 100 and the MFP 200 have established communications with each other via the access point 400. The wireless LAN has two basic modes of communications: the infrastructure mode in which apparatuses perform communications via the access point 400 and the ad hoc mode where apparatuses directly communicate with each other. When the portable terminal 100 is connected to the access point 400 and the MFP 200 is connected to the LAN-2 by wire, the communications mode is the infrastructure mode.

In order to connect to the access point 400, it is necessary for the portable terminal 100 to have the same SSID and encryption code as the access point 400. The SSID is included in the beacon distributed by the access point 400, while the encryption key is unknown. Therefore, the portable terminal 100 obtains the SSID and the encryption key as follows.

The portable terminal 100 includes a decoding part 12, a communications setting part 12, and a job requesting part 14. The decoding part 12 recognizes the image code 11 from an image captured by the camera 110 (FIG. 3), and decodes the image code 11 into text data. As described below, the text data includes information such as the SSID and the encryption key of the access point 400 and the IP address provided to the portable terminal 100. The text data into which the image code 11 has been decoded become the above-described connection information.

The communications setting part 13 sets the connection information in the portable terminal 100. That is, the communications setting part 13 sets the SSID and the encryption key in a register or the like of the wireless LAN communications part 108 (FIG. 3), and sets the IP address in the OS or middleware that performs IP communications. As a result, the portable terminal 100 is connected to the access point 400, and may connect to the LAN-1 or the LAN-2. In order to communicate with the MFP 200, the portable terminal 100 further needs the IP address of the MFP 200.

The job requesting part 14 receives a user's operation and requests a job such as printing to the MFP 200, for example. The portable terminal 100 includes a word processing program that enables the creation and editing of a document. For example, a printer driver called from the word processing program transmits a job request and document data to the MFP 200 as the job requesting part 14.

The portable terminal 100 obtains the IP address of the MFP 200 by one of the following two methods.

(i) The server 300 (or the MFP 200) encodes the connection information including the IP address of the MFP 200 into the image code 11.

(ii) The portable terminal 100 requests a DNS function part 21 of the server 300 to perform name resolution based on the host name of the MFP 200.

According to the method (i), it is necessary for the server 300 or the MFP 200 to include the IP address of the MFP 200 in the image code 11, while it is ensured that the portable terminal 100 obtains the IP address of the MFP 200. According to the method (ii), it is possible to reduce the amount of information of the image code 11, while it is necessary for the portable terminal 100 to obtain the host name of the MFP 200.

[MFP]

The MFP 200 includes a server requesting part 15, a request reception part 16, and a job execution part 17. The server requesting part 15 requests the server 300 to generate the connection information, and obtains the connection information. The connection information may be obtained without a request from the server requesting part 15. As described below, the server 300 generates the connection information and transmits the connection information to the MFP 200. Preferably, the server requesting part 15 is implemented as, for example, a Web browser. This is because the MFP 200 accesses the server 300 in response to receiving a user's operation, and displays the connection information received from the server 300. This operation is the same as common communications between a PC and a Web server. The server requesting part 15 renders a Web page written in HTML or XML, and displays the Web page on the display part 215 (FIG. 5) as a screen to be described below. Accordingly, it is preferable that the server 300 encode the connection information into the image code 11. However, the MFP 200 may also encode the connection information depending on the kind of connection information and/or the ease of management of the connection information.

For example, an administrator may design the network system 500 so that the server 300 generates, of the connection information, only the information other than the SSID and the encryption key. In this case, the MFP 200 encodes the SSID and the encryption key. Therefore, it is preferable that the MFP 200 encode all the connection information including the IP address of the MFP 200. (Otherwise, a user has to capture images of two image codes.) Accordingly, the MFP 200 may generate the image code 11.

The server requesting part 15 may request the connection information when receiving a user's operation, or may receive the connection information from the server 300 after the activation of the MFP 200 without receiving a user's operation. In the former case, an IP address is not wasted, while in the latter case, it is possible for the MFP 200 to constantly store one or more connection information items. A manager of the MFP 200 may determine which operating mode to use. In either case, a user of the portable terminal 100 captures an image of the image code 11 displayed on the display part 215, and the decoding part 12 of the portable terminal 100 decodes the image code 11.

When the portable terminal 100 is enabled to communicate with the access point 400 and the portable terminal 100 obtains the IP address of the MFP 200, the portable terminal 100 is enabled to communicate with the MFP 200. The request reception part 16 receives document data and a job request using the document data from the portable terminal 100. The request reception part 16 determines the contents of the job request, and transmits the job request together with the document data to the job execution part 17.

The job execution part 17, which is, for example, a plotter control part that controls the plotter engine 213 (FIG. 5) or a FCU control part that controls the FCU 211 (FIG. 5), controls the plotter engine 213 or the FCU 211 based on the job request and executes a job. Thus, it is possible for the portable terminal 100 to connect to the LAN-1 or the LAN-2 to use the MFP 200 at a visited location.

[Server]

The server 300 includes a communications control part 18, a DHCP function part 19, the DNS function part 21, and a document data management part 22. Further, the server 300 contains an access point table 24 in which the SSID and the encryption key of each access point 400 are recorded.

The communications control part 18 generates and transmits a Web page when communicating with the server requesting part 15. For example, HTTP(S) is used as a protocol, but any protocol may be used. The communications control part 18 determines which one of the LAN-1 and the LAN-2 the MFP 200 is connected to based on, for example, the IP address of the MFP 200, and reads the SSID and the encryption key of the access point 400 of the determined one of the LAN-1 and the LAN-2 from the access point table 24.

In addition, the communications control part 18 may manage the SSID and the encryption key in correlation with a serial number or the like unique to the MFP 200. That is, the SSID and the encryption key of the access point 400 close to the MFP 200 are correlated with the MFP 200. In this case, the communications control part 18 may receive a serial number from the MFP 200 and transmit the SSID and the encryption key of the access point 400 close to the MFP 200 to the MFP 200.

The communications control part 18 directly communicates with the MFP 200. Therefore, the server 300 has been informed of the IP address of the MFP 200. Therefore, it is possible for the communications control part 18 to include the IP address of the MFP 200 in the connection information.

The DHCP function part 19, which is an application of the function of a DHCP server to the network system 500 of this embodiment, has a function equivalent to that of the DHCP server. In general, the DHCP server delivers an IP address in the following procedure.

(a) A DHCP client transmits a DHCPDISCOVER message to the DHCP server (by broadcasting with a source IP address of "0, 0, 0, 0").

(b) The DHCP server returns a DHCPOFFER message (by broadcasting). This DHCPOFFER message includes a candidate IP address to be assigned.

(c) In response to receiving the candidate IP address, the DHCP client transmits a DHCPREQUEST message to the DHCP server (with the IP address of the DHCP server as a destination and a source IP address of "0, 0, 0, 0"). This message serves as an IP address obtaining request.

(d) The DHCP server transmits a DHCPACK message. In general, the DHCP server includes a "subnet mask", a "default gateway", the "IP address of a DNS server", and a "host name" in the DHCPACK message. These information items are written in a file "dhcpd.conf" in advance.

Thereafter, the DHCP server records the host name and the IP address of the DHCP client in correlation with each other in the DNS server. This makes it possible for the DNS server to perform name resolution in response to a request from an apparatus.

In response to receiving a request for the connection information from the server requesting part 15 of the MFP 200, the DHCP function part 19 generates an IP address and a host name that are not redundant within the managed network (the LAN-1 and the LAN-2 in this embodiment) in place of the DHCPDISCOVER message of (a). The DHCP function part 19 is different from the function of the DHCP server in that the generated IP address and host name are not of the MFP 200 but of the portable terminal 100. Further, because it is difficult to execute the process of (b) through (d) with respect to the portable terminal 100, the communications control part 18 creates the image code 11 by encoding the IP address together with the SSID and the encryption key, and transmits the image code 11 to the server requesting part 15 of the MFP 200.

Further, the DHCP function part 19 transmits the IP address and the host name to the DNS function part 21. Like the DNS server, the DNS function part 21 records the IP address and the host name in correlation with each other.

The document data management part 22 manages the document data of a user stored in a document data database (DB) 23. The user may obtain these document data using the portable terminal 100 connected to the LAN-1 or the LAN-2.

FIG. 8 illustrates a management table retained by the document data management part 22. In the management table, the items of "Group Affiliation," "User ID," "Document Name," "URI," and "Sharability" are recorded in correlation with one another as a record. The item "Group Affiliation" is a group to which a user belongs. One or more users belong to one group. The correlation between users and groups is known. The item "User ID" is a number, symbol, numerical value, alphabetical letters or a combination of two or more of them that uniquely identifies a user. The item "Document Name" is, for example, a filename. The item "URI" is a folder (or directory) in which document data are stored. In the item "Sharability," whether to share document data with other users is set. Here, "NO Sharing" means that the document data cannot be shared, "Sharable within Group" means that the document data may be shared by users who belong to the same group, and "Unlimited Sharing" means that the document data may be shared by all users. In addition to document data, video data and audio data may also be recorded in the document data DB 23. Further, in addition to characters, symbols, and numerical values, photographs and figures may also be included in document data.

[Connection Information]

A description is given of the connection information other than the SSID, the encryption key, and the IP address.

[Subnet Mask and Default Gateway]

The LAN-1 and the LAN-2 have different network addresses, and therefore form different subnetworks (subnets). Therefore, in order for an apparatus of the LAN-1 to transmit a frame to an apparatus of the LAN-2, it is necessary for the frame to go through the router 401 (FIG. 2). The subnet mask is a numerical value of the same number of digits as an IP address for determining whether a destination apparatus is connected to the same subnet. Each apparatus determines whether the apparatus and a destination apparatus belong to the same subnet by calculating the logical product of its own IP address and the subnet mask and the logical product of the IP address of the destination apparatus and the subnet mask. In the case where the destination apparatus belongs to the same subnet, the MAC address of the destination apparatus is set in the destination MAC address of the frame. In this case, the communication is completed within the subnet. In the case where the destination apparatus belongs to a different subnet, the MAC address of the router 401 is set in the destination MAC address of the frame. As a result, the router 401 relays the frame to the different subnet, so that it is possible to perform a communication.

The MAC address of the router 401 in this case is the "default gateway". Accordingly, as a result of the DHCP server delivering the "subnet mask" and the "default gateway" along with the IP address, the portable terminal 100 is allowed to communicate beyond the router 401. In other words, when the portable terminal 100 communicates with an MFP or the like within a single subnet (within a LAN), the "subnet mask" and the "default gateway" are not necessary, and when the portable terminal 100 communicates with an MFP or the like in a different subnet, the "subnet mask" and the "default gateway" are necessary.

[Host Name]

Further, the "host name" that the DHCP function part 19 provides to the portable terminal 100 is not necessary, either, because of a low necessity of other apparatuses obtaining the IP address of the portable terminal 100. Meanwhile, the IP address of the MFP 200 is necessary in order for the portable terminal 100 to communicate with the MFP 200.

[IP Address of DNS Server]

In this embodiment, it is assumed that the IP address of the DNS server is the IP address of the server 300. The IP address of the DNS server is unnecessary once the portable terminal 100 obtains the IP address of the MFP 200. Meanwhile, in the case of connecting to the Internet, the IP address of the DNS server is necessary because it is rare that a user knows the IP address of a connection destination.

Thus, the portable terminal 100 may obtain the SSID, the encryption key, its own IP address, the subnet mask, the default gateway, the IP address of the DNS server (the DNS function part 21), the host name, and the IP address of the MFP 200 from the image code 11. Further, the portable terminal 100 may also obtain the IP address of the server 300, the domain name, the IP address of an NTP server, the IP address of a proxy server, the port number of the proxy server, etc., from the image code 11.

[Obtaining of Document Data by User]

A user may download document data into the MFP 200 or download document data into the portable terminal 100.

In using the MFP 200, a user inputs a user ID and a password to the MFP 200 or causes the MFP 200 to read a user ID and a password from an IC card. As a result, the MFP 200 obtains the user ID. The MFP 200 transmits the user ID to the server 300 and requests a list of document data, so that the user may use not only the document data of her/his own but also the document data of other users that the user is authorized to share.

Further, in addition to thus using document data by way of the MFP 200, the portable terminal 100 may directly access the server 300 and use document data. In this case, the IP address of the server 300 as a document management server is necessary. Because the IP address of the server 300 is known to the server 300 or the MFP 200, it is possible for the MFP 200 to encode the IP address of the server 300 into the image code 11.

[Connections Other than Wireless LAN]

The portable terminal 100 may communicate with the MFP 200 using a short-range radio communication technology such as Bluetooth (registered trademark) (hereinafter, this notation is omitted) instead of a wireless LAN. In this case, for communications between the MFP 200 and the portable terminal 100, it is necessary to set the same PIN code (also referred to as a passkey) in their respective Bluetooth communications devices. Therefore, the server 300 encodes the PIN code of the Bluetooth communications device of the MFP 200 into the image code 11 as the connection information.

According to Bluetooth, it is necessary for apparatuses to have the same profile in order to communicate with each other. The portable terminal 100 and the MFP 200 have, for example, PAN, which is a profile having a high affinity with the IP network.

Once communications are established based on PAN, it is possible to establish an IP connection between the portable terminal 100 and the MFP 200. That is, another subnet is created on the LAN-1 side. For example, as a result of the MFP 200 having a router function, it is possible for the portable terminal 100 to connect to the LAN-2, including the server 300, and the Internet via the MFP 200.

Other short-range radio communication standards include ZigBee and wireless IEEE 1394.

[Screen Examples]

A description is given, with reference to FIGS. 9A through 9C and FIG. 10 as well as FIG. 5, of screens created and displayed on the display part 215 by the server requesting part 15 (Web browser).

FIG. 9A is a diagram illustrating a default screen displayed on the display part 215. When a user wishes to connect to the Internet or to the MFP 200, the user operates the operations panel 214 to cause the screen illustrated in FIG. 9A to be displayed. Two soft keys A and B are displayed on the default screen.

The soft key A, which reads "Participate in this network with a mobile device", is selected by a user in the case of connecting the portable terminal 100 to the Internet via the LAN-1 or the LAN-2.

The soft key B, which reads "Connect to this apparatus", is selected by a user in the case of connecting the portable terminal 100 to the MFP 200 by connecting the portable terminal 100 to the LAN-1 or the LAN-2.

Figure 9B:

FIG. 9B is a diagram illustrating an image code screen displayed when a user selects the soft key A. Two image codes 11 of a QR code and a barcode are displayed on the image code screen of FIG. 9B. The two image codes 11 include the same information. The user may capture an image of one of the image codes 11 to which the portable terminal 100 corresponds. An IP address displayed below the image codes 11 is for explanatory purposes and is not displayed actually.

Because the user has selected the soft key A, each image code 11 of FIG. 9B includes the SSID, the encryption key, and the IP address of the portable terminal 100. In addition, each image code 11 often includes the "subnet mask," the "default gateway," the "IP address of a DNS server," and the "host name."

Here, all of these connection information items may be encoded into a single image code 11. However, if the connection information is large in size, all the connection information items may not be encoded in a single image code 11. This may be the case in particular when a barcode, which is limited in the amount of information, is adopted as the image code 11. In this case, therefore, the server requesting part 15 displays the image code 11 twice or more.

Figure 9C:
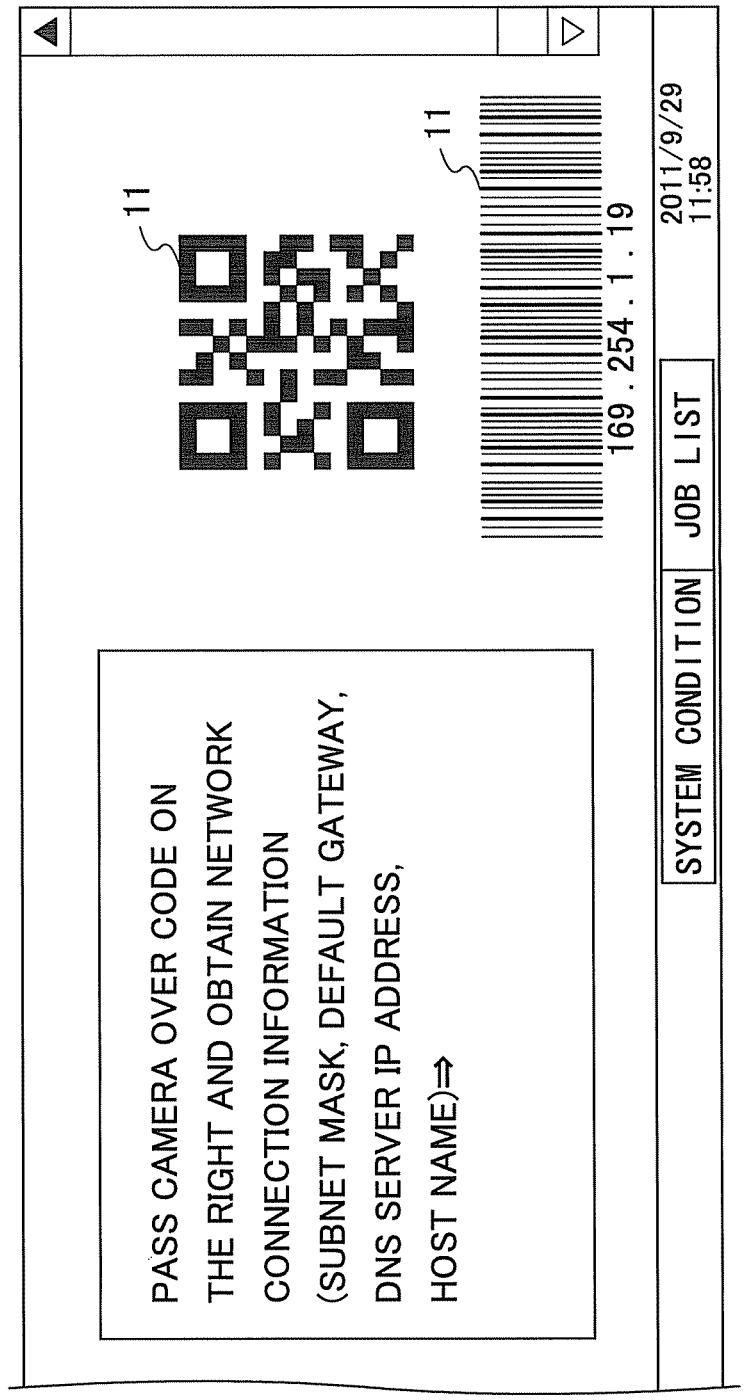

FIG. 9C is a diagram illustrating an image code screen that is displayed automatically or as a result of a user's operation of the operations panel 214 after the image code screen of FIG. 9B. When each image code 11 of FIG. 9B includes the SSID, the encryption key, and the IP address of the portable terminal 100, each image code 11 of FIG. 9C may include the remaining information including the "subnet mask," the "default gateway," the "IP address of a DNS server," and the "host name."

The automatic switching of the image code 11 by the server requesting part 15 allows a user to obtain a large amount of information in a transparent manner. In this case, for example, the image code 11 is repeatedly displayed periodically and the decoding part 12 decodes the displayed image codes 11 one after another. This makes it possible to ensure that all the connection information is obtained. When the decoding part 12 obtains the same connection information as a result of decoding, the decoding part 12 may discard the obtained connection information.

Figure 10:
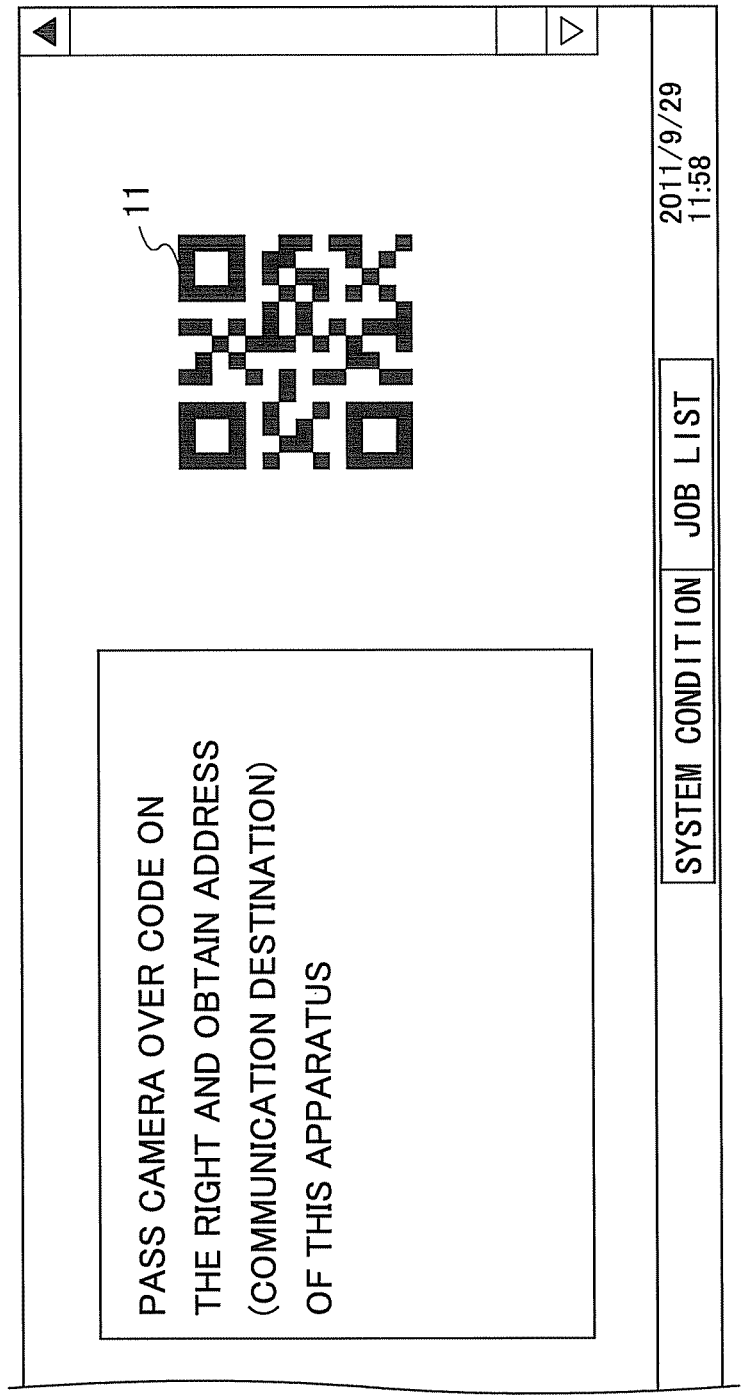
FIG. 10 is a diagram illustrating an image code screen displayed when a user selects a soft key.

FIG. 10 is a diagram illustrating an image code screen displayed when a user selects the soft key B of FIG. 9A. In FIG. 10, only a QR code is displayed. However, like in FIG. 9B, the two image codes 11 of a QR code and a barcode may be displayed on the image code screen of FIG. 10.

Because the user has selected the soft key B, the image code 11 of FIG. 10 includes the IP address of the MFP 200 or the projector 230 in addition to the connection information of FIGS. 9A and 9B. The same as in the case where the user has selected the soft key A, a possible shortage of information of the image code 11 may be compensated for by displaying multiple image codes 11 (that is, by repeatedly displaying the image code 11 periodically).

[Operational Procedure]

Figure 11:
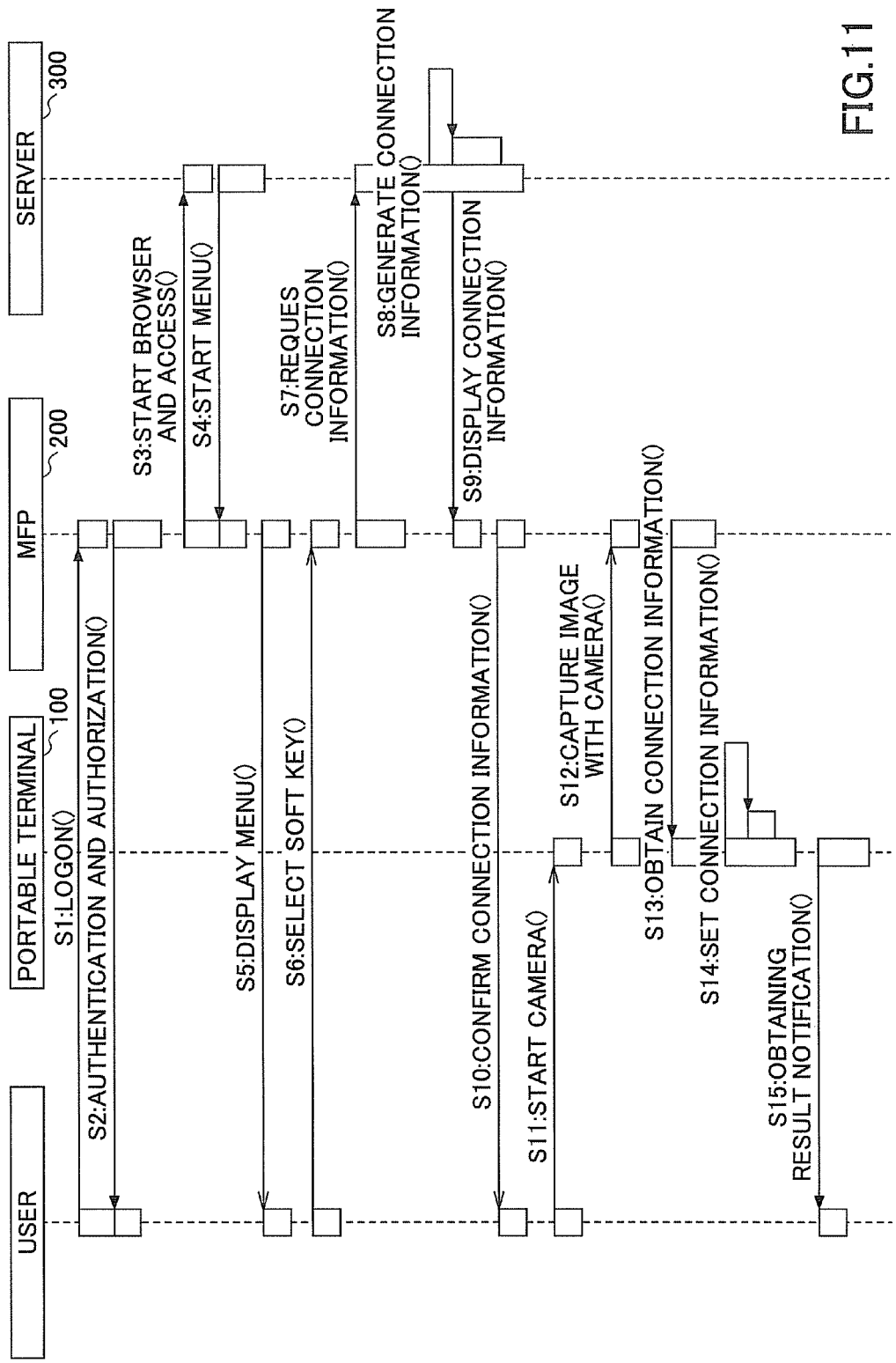
FIG. 11 is a sequence diagram illustrating an operational procedure of the network system.

FIG. 11 is a sequence diagram illustrating an operational procedure of the network system 500. While a description is given below of a case where a user uses the MFP 200, the operational procedure is the same in the case of using the projector 230.

First, in step S1, a user logs on to the MFP 200 in order to use the MFP 200 or to use a particular function. The user causes a logon screen to be displayed on the display part 215. The user operates the operations panel 214 to enter a user ID or select a user ID from a list, and enters a password. The user may enter a user ID and a password by passing an IC card over the IC card reader of the MFP 200.

In step S2, the MFP 200 determines whether the user is authenticated based on whether a combination of the entered user ID and password matches any of the pre-recorded (pre-registered) combinations of user IDs and passwords. If there is a match, the MFP 200 authenticates the user and authorizes the user to use the MFP 200. For example, the MFP 200 displays an operations menu on the operations panel 214 or displays a message such as "Authenticated."

In step S3, because the user is authorized to use the MFP 200, the server requesting part 15 of the MFP 200 accesses the server 300. Because the server requesting part 15 is, for example, a browser function, a browser starts up or is called.

In step S4, in response to a request from the browser (for example, a GET message), the server 300 causes the MFP 200 to display a menu. The menu is transmitted as, for example, a Web page (an HTTP response).

In step S5, the server requesting part 15 of the MFP 200 displays a menu screen on the display part 215. The user selects a menu that the user wishes to use from the menu screen. Once a predetermined menu is selected from multiple menus, the default screen of FIG. 9A is displayed. The user selects (depresses) the above-described soft key A or B.

In step S6, the server requesting part 15 accepts the user-selected one of the soft keys A and B. Here, it is assumed that the soft key B is selected.

In step S7, the server requesting part 15 requests the connection information from the server 300 in accordance with the user-selected soft key (the soft key B). In this case, the connection information including the "SSID," the "encryption key," the "IP address of the portable terminal 100," the "subnet mask," the "default gateway," the "IP address of a DNS server," the "host name," the "IP address of the MFP 200," the "IP address of the server 300" is requested.

In step S8, in response to receiving the request for the connection information, the communications control part 18 of the server 300 reads the SSID and the encryption key correlated with the source MFP 200 from the access point table 24. Further, the DHCP function part 19 generates the connection information. First, the DHCP function part 19 determines the "IP address of the portable terminal 100" so that the "IP address of the portable terminal 100" is not redundant in the LAN-1 or the LAN-2. The "subnet mask," the "default gateway," the "IP address of a DNS server," and the "host name" are set in dhcpd.conf. The "IP address of the MFP 200" is the source IP address of the frame (request). The communications control part 18 creates the image code 11 by encoding these connection information items.

In step S9, the communications control part 19 transmits the image code 11 to the MFP 200 as part of a Web page.

In step S10, the server requesting part 15 of the MFP 200 analyzes (renders) the Web page and displays the Web page on the display part 215, thereby displaying the image code screen of FIG. 10. As a result, the user is allowed to recognize that the connection information is displayed as the image code 11.

In step S11, the user views the image code 11, and starts the camera 110 (FIG. 3) of the portable terminal 100. If necessary, the user sets the portable terminal 100 to a code recognition mode.

In step S12, the camera 110 of the portable terminal 100 captures an image of the image code 11.

As a result, in step S13, the decoding part 12 decodes the encoded image code 11 and extracts the connection information.

In step S14, the communications setting part 13 sets the SSID, the encryption key, and the IP address of the portable terminal 100 in the portable terminal 100. As a result, the portable terminal 100 is ready to communicate with the access point 400. In addition, the "subnet mask," the "default gateway," the "IP address of a DNS server," and the "host name" are also set in the portable terminal 100. As a result, the portable terminal 100 is ready to connect to the LAN-1 or the LAN-2, or the Internet via the access point 400.

In step S15, the portable terminal 100 indicates that the settings are completed on the display part 105 by, for example, displaying a message to that effect. At this point, it is preferable to also indicate that it is possible to communicate with the MFP 200 on the display part 105. This allows the user to understand that it is possible to request the MFP 200 operated by the user to execute a job.

When the user uses the projector 230 instead of the MFP 200, the projector 230 may not have such a high processing capability as to have a browser function. In this case, the communications control part 18 of the server 300 converts the image code 11 into a JPEG image or the like and transmits the JPEG image to the projector 230 instead of transmitting an HTML Web page. Because the projector 230 or other apparatuses support JPEG images, it is possible for the projector 230 to project the image code 11.

[Connection to Access Point]

A description is given of a procedure until the portable terminal 100 establishes a connection to the access point 400 after getting ready to connect to the access point 400 in step S14.

The access point 400 periodically transmits a beacon signal, which may be received by apparatuses within an area in which radio waves arrive from the access point 400. The beacon signal includes channels (a frequency range), an ESSID, a supported transmission rate, a security system, a timestamp, QoS, etc.

(i) In response to receiving a beacon signal, the portable terminal 100 transmits a probe request to the access point 400. The probe request requests a response from the access point 400 that has the SSID that is set in the portable terminal 100.

(ii) The access point 400 transmits a probe response to the portable terminal 100. That is, the access point 400 that has the same SSID responds to the portable terminal 100.

(iii) The portable terminal 100 requests authentication from the access point 400. There are an authentication method called open system authentication and an authentication method called shared key authentication in the authentication function. In the case of shared key authentication, the portable terminal 100 encrypts challenge text received from the access point 400 with the encryption key, and transmits the encrypted challenge text to the access point 400. The access point 400 decrypts the received encrypted challenge text, and if the decrypted challenge text matches the original challenge text, the access point 400 determines that the portable terminal 100 is authenticated.

(iv) The portable terminal 100 transmits an association request (a connection request) to the access point 400.

(v) The access point 400 transmits an association response (connection authorization) to the portable terminal 100.

Thereby, the connection is established, so that it is possible for the portable terminal 100 and the access point 400 to transmit frames including data to each other.

[Notification to Server]

Figure 12:
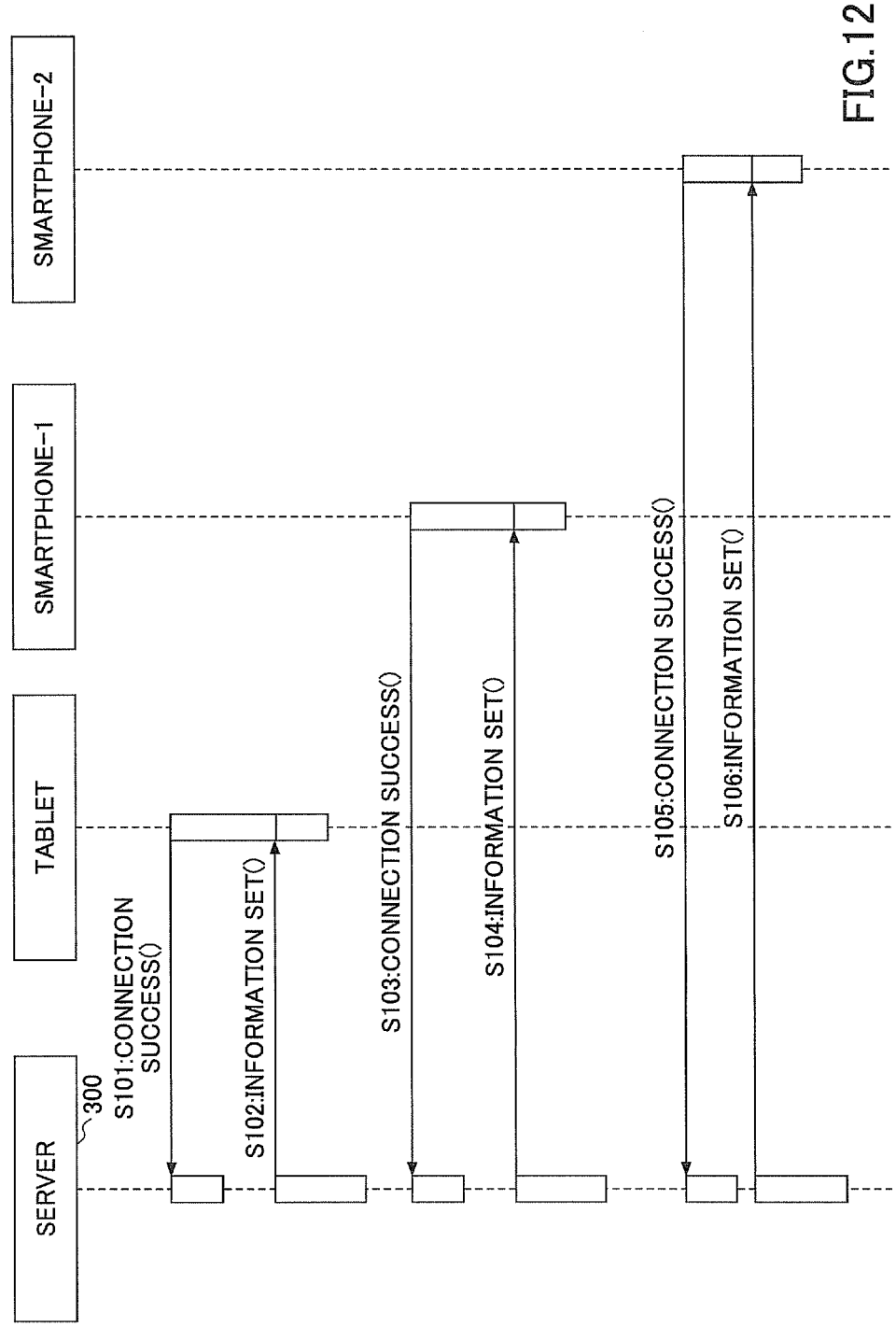
FIG. 12 is a diagram illustrating communications between the portable terminal and the server.

FIG. 12 is a diagram illustrating communications between the portable terminal 100 and the server 300. The portable terminal, which has connected to the LAN-1 or the LAN-2 by the above-described procedure, notifies the server 300 of a successful connection. In FIG. 12, a tablet, a smartphone-1, and a smartphone-2 are illustrated as examples of the portable terminal 100. Each of the tablet, the smartphone-1, and the smartphone-2 has notifies the server 300 of a connection success (steps S101, S103, and S105). In response to these notifications, it is possible for the server 300 to confirm that the connection information has been set in the portable terminal 100 and, in particular, that the issued IP address is certainly used.

Further, because the server 300 and the portable terminal 100 are connected via the LAN-1 or the LAN-2, it is possible for the server 300 and the portable terminal 100 to communicate with each other with frames (steps S102, S104, and S106). For example, the server 300 may notify the portable terminal of the connection information that does not fit in the image code 11, such as the IP address of a printer server, the IP address of an NTP server, the IP address of a proxy server, and the port number of the proxy server. Further, when there is an apparatus that requires a public key, the server 300 may create the public key as a one-time password, and set the created public key in the apparatus and transmit the created public key to the portable terminal 100. These information items may also be included in the image code 11.

Further, the server 300 determines whether the IP address is used by periodically communicating with the portable terminal 100. If there is no response from the portable terminal 100, the server 100 determines that the IP address is no longer used, and makes the IP address available for delivery to another portable terminal 100. In general, the DHCP server lends the IP address for a limited period of time, and an apparatus to which the IP address is lent periodically requests extension of use of the IP address. Therefore, the server 300 may determine that the IP address is not in use by receiving no request for extension of use of the IP address.

Further, the server 300 may transmit other various information items to the portable terminal 100, such as advertisements, announcements, and precautions.

[Other Operational Procedure]

The MFP 200 may store the connection information in advance and have the connection information displayed on the display part 215 like a screensaver. This improves convenience because an operation for displaying the connection information is unnecessary.

Figure 13:
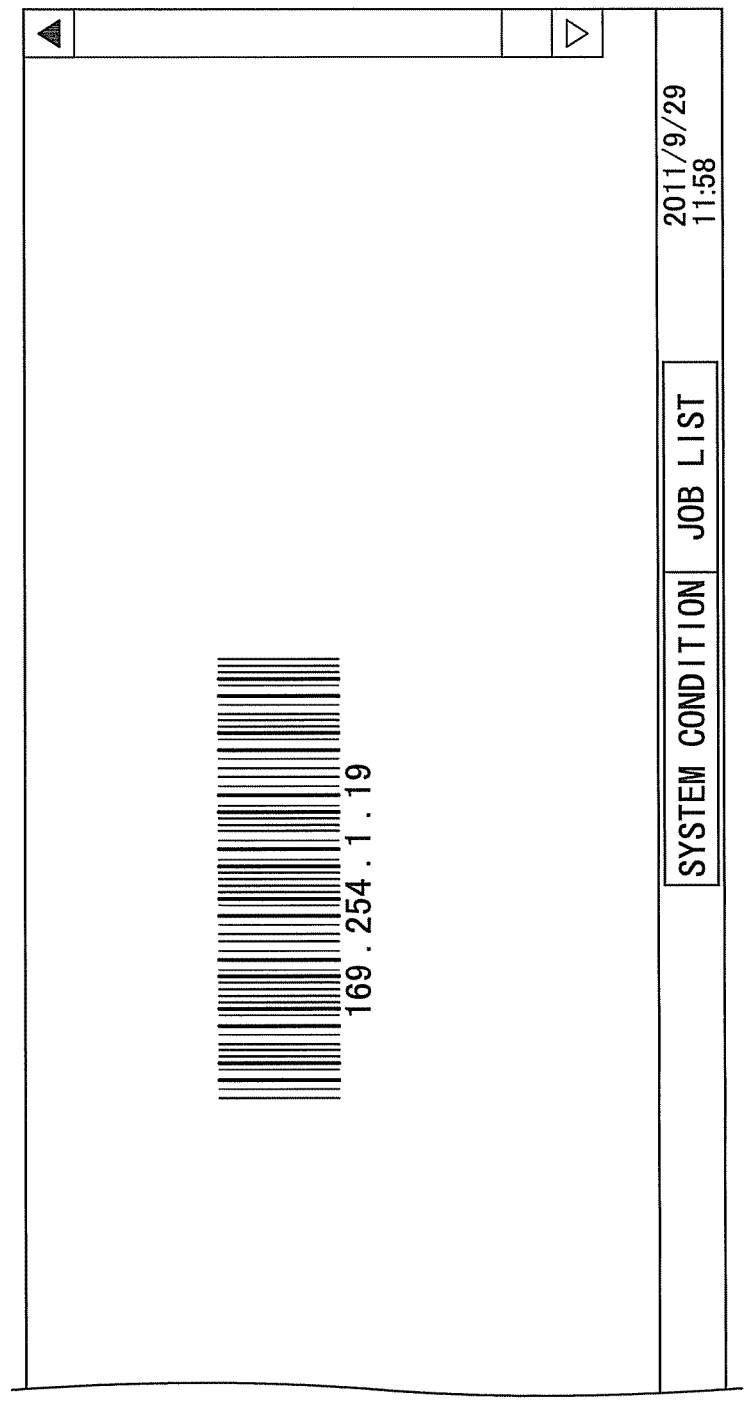
FIG. 13 is an image code screen displayed on the display part of the MFP.

FIG. 13 is an image code screen displayed on the display part 215. The server requesting part 15 of the MFP 200 obtains the connection information from the server 300 before a user's operation. When a general user who uses the MFP 200 for copying or the like without using the portable terminal 100 leaves the MFP 200, the server requesting part 15 starts to display the image code screen. This makes it possible for a user to cause the image code 11 including the connection information to be displayed and to set the connection information in the portable terminal 100 without performing a particular operation. The server requesting part 15 prevents a burn-in by periodically (approximately every one minute) changing the position of the image code 11.

Figure 14:
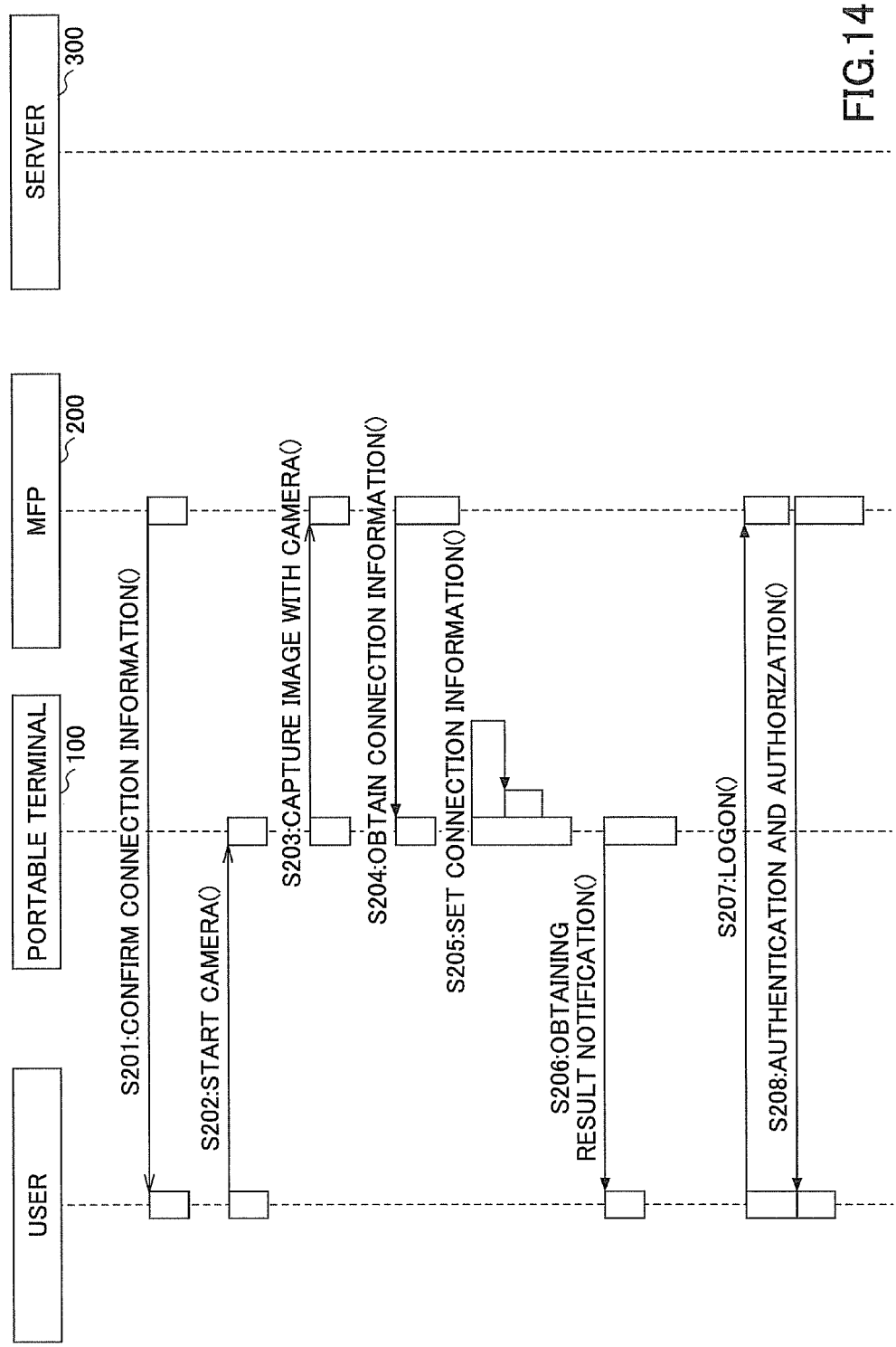
FIG. 14 is a sequence diagram illustrating an operational procedure of the network system.

FIG. 14 is a sequence diagram illustrating an operational procedure of the network system 500. Unlike FIG. 11, the procedure starts with the confirmation of the connection information in step S201. In step S201, the image code 11 of the screen saver of FIG. 13 is displayed. The process of steps S202 through S206 is the same as the process of steps S11 through S15 of FIG. 11.

Then, in step S207, the user logs on and in step S208, the MFP 200 authenticates the user and authorizes the user to use the MFP 200. As a result, the user is allowed to use the functions of the MFP 200. Further, the portable terminal 100 executes the process illustrated in FIG. 12.

In FIG. 13, the image code 11 is illustrated as a screensaver. However, the image code 11 may also be displayed with existing information such as the startup logo or the about screen of the MFP 200. That is, the image code 11 is not displayed as a screensaver but is displayed with other existing information. This makes it possible to prevent the operational system of the MFP 200 from being complicated.

[Job Execution]

Figure 15:
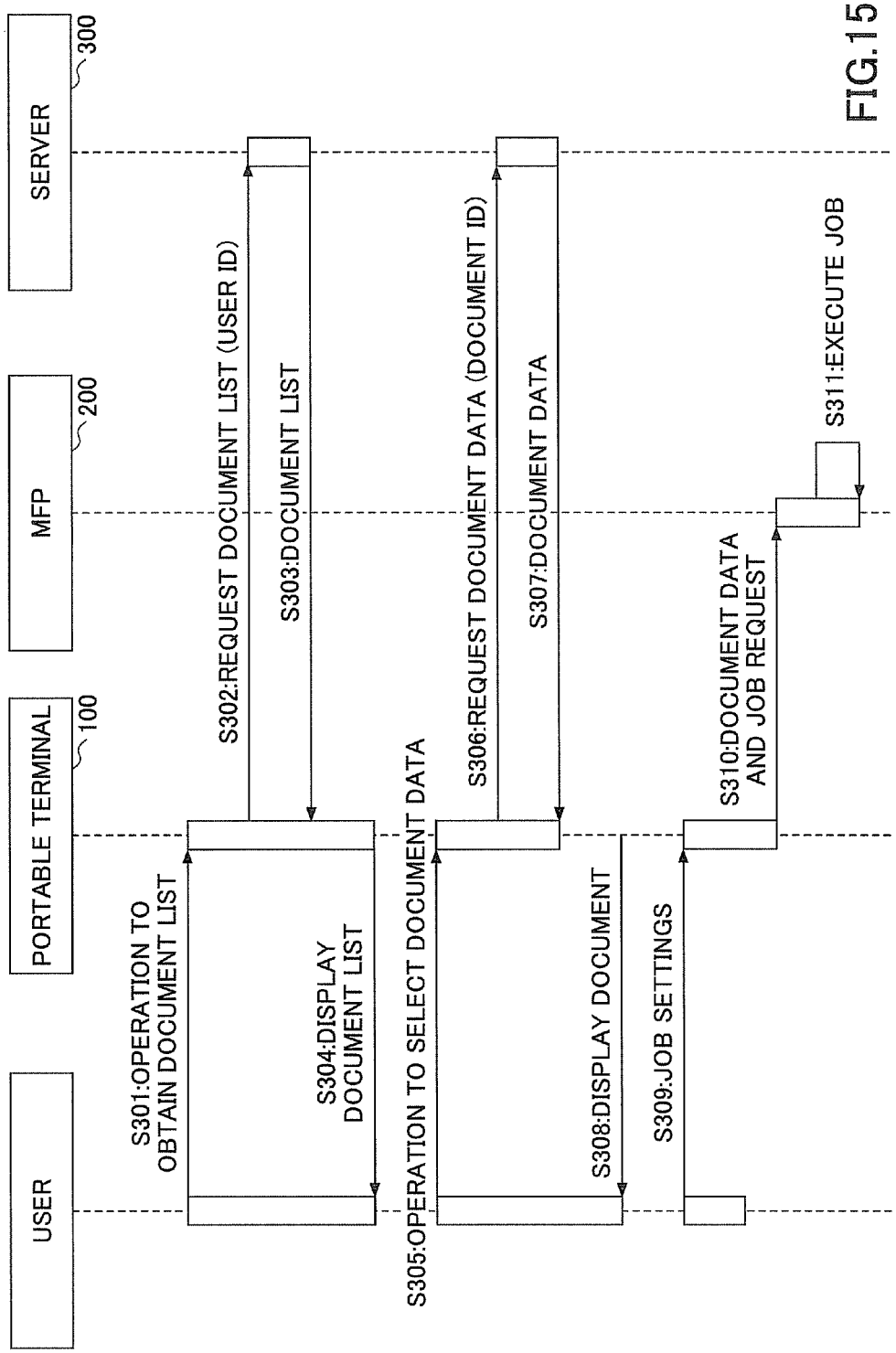
FIG. 15 is a sequence diagram illustrating a procedure for execution of a job by the network system.

FIG. 15 is a sequence diagram illustrating a procedure for execution of a job by the network system 500. The portable terminal 100 has connected to the access point 400 and has been ready to communicate with the MFP 200 and the server 300.

In step S301, a user performs an operation to obtain a document list from the server 300 on the portable terminal 100. At this point, the user enters a user ID. The MFP has transmitted the user ID of the user who has logged on to the MFP 200 to the server 300 in advance. Sharing the authentication result between the MFP 200 and the server 300 reduces the number of a user's operation for authentication to one. Alternatively, the user may newly log on to the server 300.

In step S302, the portable terminal 100 transmits a request for a document list to the server 300 using the user ID as a key.

In step S303, the document data management part 22 of the server 300 creates a document list of the document data correlated with the user ID from the document data DB 23. Further, a document list of the document data of other users whose "Group Affiliation" correlated with the user ID is the same as that of the user and whose "Sharability" is "Sharable within Group" and/or a document list of document data whose "Sharability" is "Unlimited Sharing" irrespective of the user ID may be added. The document data management part 22 transmits the document list to the portable terminal 100.

In step S304, the portable terminal 100 displays the document list on the display part 105 (FIG. 3).

In step S305, the user performs an operation to select at least one document from the document list on the portable terminal 100.

In step S306, the portable terminal 100 transmits a request for document data to the server 300 using, for example, the document ID of the selected document (document data) as a key.

In step S307, the document data management part 22 of the server 300 reads the document data identified with the document ID from the document data DB 23, and transmits the document data to the portable terminal 100.

In step S308, the portable terminal 100 displays the received document (document data). The portable terminal 100 uses an application program that supports the format of the document data in displaying the document data, such as a word processing program.

In step S309, the user operates the portable terminal 100 (a word processing program) to provide job settings for the received document data.

In step S310, when the user performs an operation on print execution, the portable terminal 100 transmits the document data and a job request to the MFP 200.

In step S311, the MFP 200 executes a job.

Thus, a user may connect to the network of a visited location by the simple operation of image capturing and print out a document stored in the server 300 at the nearest MFP 200.

Further, a user may also print out a document stored in the portable terminal with the MFP 200. Further, because the portable terminal 100 and the MFP 200 communicate with each other, a user may remotely operate the MFP 200 using the portable terminal 100. For example, a user may cause a document displayed on the portable terminal 100 to be directly scanned with the MFP 200 or cause an original material to be scanned with the MFP 200.

Further, a user may transmit document data (which may be either obtained from the server 300 or stored in the portable terminal 100) and a job request to the MFP 200 and request conversion of the format of the document data or image processing on the document data.

[Other Information to be Included in Image Code]

Before a user B connects a portable terminal B to a network, a portable terminal A of another user A may be connected to the network. In this case, by including the IP address of the portable terminal A in the image code 11 whose image is captured with the portable terminal B of the user B, it is possible for the user B to communicate with the user A. Because both the user A and the user B have been authenticated by the MFP 200, the user A and the user B may communicate with each other at a visited location while ensuring security. The server 300 may directly transmit the IP address of the portable terminal A to the portable terminal B instead of transmitting the image code 11.

Further, it is also effective to include the document ID of a document registered with the server 300 by the portable terminal A or downloaded by the portable terminal A in the image code 11 whose image is captured with the portable terminal B of the user B. In this case, the portable terminal A of the user A specifies and registers a document used in a meeting or the like, so that the user B who later connects to the LAN-1 or the LAN-2 may immediately obtain a material used in the meeting.

The server 300 may notify the portable terminal B of the document ID. In this case, however, it is necessary for the user A to register the user ID of the user B to whom the document may be delivered (because the IP address of the portable terminal B is unknown). In order to omit this operation, the portable terminal B of the user B who logs on within a predetermined period of time (for example, within 12 hours) after the portable terminal A logs on may be notified of the document ID. However, this is not preferable because users other than the user B may log on to the MFP 200.

Meanwhile, it may be assumed that users who display the image code 11 are only those who cannot connect to a network (who are out). Accordingly, by including the document ID in the image code 11 that is displayed for, for example, a predetermined period of time after the portable terminal A logs on, the user A and the user B may share a document with simple security.

For example, when the document data management part 22 receives the notification that the user A has logged on to the MFP 200, the document data management part 22 records the first communication with the portable terminal A or the obtaining of a document by the portable terminal A with time. Then, the document data management part 22 records the document ID of the document obtained by the portable terminal A or the document ID registered by the portable terminal A.

Then, after the recordation with time, when the DHCP function part 19 generates the connection information, the document data management part 22 requests the DHCP function part 19 to include the recorded document ID in the connection information. This allows the user B of the portable terminal B to easily obtain the document ID of the document used by the user A. In addition to the document ID, the information to be shared between the users A and B may also be communicated.

As described above, according to the network system 500 of this embodiment, the connection information for connecting to the network 99, the MFP 200, and the server 300 is provided as the image code 11, so that it is possible to prevent the degradation of security. It is possible for a user who is out (at a visited location) to download a document or use the MFP 200 by a simple operation of capturing an image of the image code 11 using the portable terminal 100. Further, it is possible for a user to share information through the image code 11 with other users who connect to a network through the image code 11. In this case, a large amount of information may be provided by displaying the image code 11 several times.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A system, comprising:
   an access point provided in a network;
   an image processing apparatus connected to the network;
   a portable terminal; and
   a server connected to the image processing apparatus via the network,
   wherein the server includes
      a first processor; and
      a first memory storing a first program that, when executed by the first processor, causes the server to transmit, to the image processing apparatus, a service set identifier and a password for accessing the access point, and an IP address of the portable terminal,
   wherein the image processing apparatus includes
      a second processor; and
      a second memory storing a second program that, when executed by the second processor, causes the image processing apparatus to:
         receive the service set identifier, the password, and the IP address of the portable terminal transmitted from the server;

display an image, the image including an IP address of the image processing apparatus and the received service set identifier, password, and IP address of the portable terminal; and execute a job transmitted via the network, and wherein the portable terminal includes a camera;

a third processor; and a third memory storing a third program that, when executed by the third processor, causes the portable terminal to:

obtain the IP address of the image processing apparatus, the service set identifier, the password, and the IP address of the portable terminal included in the image displayed on the image processing apparatus, from the image displayed on the image processing apparatus, which is included in an image captured with the camera;

set the obtained service set identifier, password, and IP address of the portable terminal in the portable terminal;

connect to the network via the access point using the set service set identifier and password; and transmit the job to the image processing apparatus identified by the obtained IP address of the image processing apparatus, via the network to which the portable terminal has connected.

2. The system as claimed in claim 1, wherein when executed by the first processor, the first program further causes the server to generate the IP address of the image processing apparatus, the service set identifier, the password, and the IP address of the portable terminal; and transmit the generated IP address of the image processing apparatus, service set identifier, password, and IP address of the portable terminal to the image processing apparatus.

3. The system as claimed in claim 1, wherein when executed by the third processor, the third program further causes the portable terminal to connect to the network by radio based on the set service set identifier and password.

4. The system as claimed in claim 1, wherein the image processing apparatus is a multifunction peripheral, and the job is printing of data stored in the portable terminal, by the multifunction peripheral.

5. The system as claimed in claim 1, wherein the image processing apparatus is a multifunction peripheral, a file is stored in the first memory of the server, and when executed by the third processor, the third program further causes the portable terminal to obtain the file from the server via the network; and transmit the job to the multifunction peripheral, the job being printing of the obtained file by the multifunction peripheral.

6. The system as claimed in claim 1, wherein the image processing apparatus is caused to display the image that further includes an IP address of another portable terminal connected to the network, and when executed by the third processor, the third program further causes the portable terminal to obtain the IP address of said another portable terminal included in the image displayed on the image processing apparatus, from the image displayed on the image processing apparatus, which is included in the image captured with the camera.

7. The system as claimed in claim 1, wherein, when executed by the third processor, the third program causes the portable terminal to obtain the IP address of the image processing apparatus, the service set identifier, the password, and the IP address of the portable terminal with the portable terminal being disconnected from the network; and transmit the job to the image processing apparatus after the portable terminal connects to the network.

8. A system, comprising:

an access point provided in a network;

an image processing apparatus connected to the network; and a portable terminal, wherein the image processing apparatus includes a first processor; and a first memory storing a first program that, when executed by the first processor, causes the image processing apparatus to receive a service set identifier and a password for accessing the access point and an IP address of the portable terminal from an apparatus different from the image processing apparatus; and display an image, the image including an IP address of the image processing apparatus and the received service set identifier, password, and IP address of the portable terminal, and wherein the portable terminal includes a camera;

a second processor; and a second memory storing a second program that, when executed by the second processor, causes the portable terminal to:

obtain the IP address of the image processing apparatus, the service set identifier, the password, and the IP address of the portable terminal included in the image displayed on the image processing apparatus, from the image displayed on the image processing apparatus, which is included in an image captured with the camera;

set the obtained service set identifier, password, and IP address of the portable terminal in the portable terminal;

connect to the network via the access point using the set service set identifier and password; and transmit the job to the image processing apparatus identified by the obtained IP address of the image processing apparatus, via the network to which the portable terminal has connected.

9. The system as claimed in claim 8, further comprising:

a server configured to transmit, to the image processing apparatus, the IP address of the image processing apparatus, the service set identifier, the password, and the IP address of the portable terminal, wherein the server is the apparatus different from the image processing apparatus.

10. The network system as claimed in claim 8, wherein the IP address of the image processing apparatus, the service set identifier, the password, and the IP address of the portable terminal are stored in the first memory of the image processing apparatus, and when executed by the first processor, the first program further causes the image processing apparatus to display the image including the IP address of the image processing apparatus, the service set identifier, the password, and the IP address of the portable terminal stored in the first memory.

11. The system as claimed in claim 8, wherein
when executed by the second processor, the second program further causes the portable terminal to connect to the network by radio based on the set service set identifier and password.

12. The system as claimed in claim 8, wherein
the image processing apparatus is a multifunction peripheral, and
the job is printing of data stored in the portable terminal, by the multifunction peripheral.

13. The system as claimed in claim 8, wherein
the image processing apparatus is a multifunction peripheral, and
when executed by the second processor, the second program further causes the portable terminal to
obtain a file stored in the apparatus different from the image processing apparatus; and
transmit the job to the multifunction peripheral, the job being printing of the obtained file by the multifunction peripheral.

14. A network connection method in a system including an access point provided in a network, an image processing apparatus connected to the network, and a portable terminal, the network connection method comprising:
receiving, by the image processing apparatus, a service set identifier and a password for accessing the access point and an IP address of the portable terminal from an apparatus different from the image processing apparatus;
displaying, by the image processing apparatus, an image, the image including an IP address of the image processing apparatus and the received service set identifier, password, and IP address of the portable terminal;
obtaining, by the portable terminal, the IP address of the image processing apparatus, the service set identifier, the password, and the IP address of the portable terminal included in the image displayed on the image processing apparatus, from the image displayed on the image processing apparatus, which is included in an image captured with a camera of the portable terminal;
setting, by the portable terminal, the obtained service set identifier, password, and IP address of the portable terminal in the portable terminal;
connecting, by the portable terminal, to the network via the access point using the set service set identifier and password; and
transmitting, by the portable terminal, the job to the image processing apparatus identified by the obtained IP address of the image processing apparatus, via the network to which the portable terminal has connected.

15. The network connection method as claimed in claim 14, further comprising:
transmitting, by a server, the IP address of the image processing apparatus, the service set identifier, the password, and the IP address of the portable terminal to the image processing apparatus, the server being the apparatus different from the image processing apparatus.

16. The network connection method as claimed in claim 14, wherein
the IP address of the image processing apparatus, the service set identifier, the password, and the IP address of the portable terminal are stored in the image processing apparatus, and
the image processing apparatus displays the image including the IP address of the image processing apparatus, the service set identifier, the password, and the IP address of the portable terminal stored in the image processing apparatus.

17. The network connection method as claimed in claim 14, wherein the portable terminal connects to the network by radio based on the set service set identifier and password.

18. The network connection method as claimed in claim 14, wherein
the image processing apparatus is a multifunction peripheral, and
the job is printing of data stored in the portable terminal, by the multifunction peripheral.

19. The network connection method as claimed in claim 14, further comprising:
obtaining, by the portable terminal, a file stored in the apparatus different from the image processing apparatus,
wherein
the image processing apparatus is a multifunction peripheral, and
the portable terminal transmits the job to the multifunction peripheral, the job being printing of the obtained file by the multifunction peripheral.

* * * * *